United States Patent
D'Angelo et al.

(10) Patent No.: US 10,300,865 B2
(45) Date of Patent: May 28, 2019

(54) FORK-MOUNT BICYCLE CARRIER

(71) Applicant: Yakima Products, Inc., Lake Oswego, OR (US)

(72) Inventors: Gian-Marco D'Angelo, Portland, OR (US); Charles Kraeuter, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 123 days.

(21) Appl. No.: 15/614,530

(22) Filed: Jun. 5, 2017

(65) Prior Publication Data
US 2017/0349113 A1 Dec. 7, 2017

Related U.S. Application Data

(60) Provisional application No. 62/345,837, filed on Jun. 5, 2016.

(51) Int. Cl.
*B60R 9/10* (2006.01)
*B60R 9/048* (2006.01)

(52) U.S. Cl.
CPC ............ *B60R 9/10* (2013.01); *B60R 9/048* (2013.01)

(58) Field of Classification Search
CPC .. B60R 9/058; B60R 9/04; B60R 9/00; B60R 9/045; B60R 9/048; B60R 9/10; Y10S 224/924; F16B 2/14; F16B 2/185; F16B 2/18
USPC ............... 224/324, 331, 322, 422, 533, 315, 224/535–537, 319, 309, 321; 403/DIG. 9; 248/316.5
See application file for complete search history.

(56) References Cited

U.S. PATENT DOCUMENTS

| 357,287 A | 2/1887 | Nolte |
| 376,055 A | 1/1888 | Hopkins et al. |
| 668,791 A | 2/1901 | Blake et al. |
| 993,954 A | 5/1911 | Budlong |
| 1,505,883 A | 8/1924 | Gleason |

(Continued)

FOREIGN PATENT DOCUMENTS

| CH | 272137 A | 11/1950 |
| DE | 2556352 A1 | 6/1977 |

(Continued)

OTHER PUBLICATIONS

The U.S. Receiving Office of WIPO, International Search Report and Written Opinion of the International Searching Authority regarding PCT Patent Application No. PCT/US2017/036014 dated Sep. 6, 2017, 12 pages.

(Continued)

*Primary Examiner* — Justin M Larson
*Assistant Examiner* — Matthew T Theis
(74) *Attorney, Agent, or Firm* — Kolisch Hartwell, P.C.

(57) ABSTRACT

A fork mount upright bicycle carrier may include an elongate base having a pair of parallel rails and a fork mount device. A rear wheel receiver may be adjustably coupled in sliding engagement with a first slot in each of the rails, and a rear crossbar clamp may be adjustably coupled in a second slot in each of the rails, such that the receiver and the clamp are capable of overlapping adjustment ranges. The fork mount device may include a fixed jaw and a pivoting jaw for clamping onto a transverse member of a bicycle fork.

20 Claims, 16 Drawing Sheets

(56) References Cited

U.S. PATENT DOCUMENTS

| | | |
|---|---|---|
| 2,271,452 A | 1/1942 | Carroll |
| 2,576,222 A | 11/1951 | Hill |
| 2,630,257 A | 3/1953 | Nielsen |
| 2,764,438 A | 9/1956 | Haviland |
| 2,765,016 A | 10/1956 | Parsegian |
| 2,840,288 A | 6/1958 | Broddon |
| 2,895,748 A | 7/1959 | Oldham |
| 2,948,560 A | 8/1960 | Rop |
| 2,999,378 A | 9/1961 | Blair |
| 3,165,353 A | 1/1965 | Weise |
| 3,204,839 A | 9/1965 | Yuda et al. |
| 3,239,115 A | 3/1966 | Bott et al. |
| 3,242,704 A | 3/1966 | Barreca |
| 3,258,820 A | 7/1966 | Steinberg |
| 3,292,222 A | 12/1966 | Steinberg |
| 3,460,788 A | 8/1969 | Goldman |
| 3,662,435 A | 5/1972 | Allsop |
| 3,668,791 A | 6/1972 | Salzman et al. |
| 3,719,297 A | 3/1973 | Nowicki |
| 3,828,993 A | 8/1974 | Carter |
| 3,843,001 A | 10/1974 | Willis |
| 3,848,784 A | 11/1974 | Shimano et al. |
| 3,848,785 A | 11/1974 | Bott |
| 3,861,533 A | 1/1975 | Radek |
| 3,893,568 A | 7/1975 | Lile |
| 3,900,923 A | 8/1975 | Thomas |
| 3,906,593 A | 9/1975 | Caveney et al. |
| 3,912,139 A | 10/1975 | Bowman |
| 3,922,018 A | 11/1975 | Shook |
| 3,999,409 A | 12/1976 | Bell |
| 4,021,888 A | 5/1977 | Aimar |
| 4,028,915 A | 6/1977 | Stahl |
| 4,057,182 A | 11/1977 | Kolkhorst et al. |
| 4,057,183 A | 11/1977 | Ness |
| 4,112,557 A | 9/1978 | Salomon |
| 4,114,409 A | 9/1978 | Scire |
| 4,126,228 A | 11/1978 | Bala et al. |
| 4,193,171 A | 3/1980 | Lichowsky |
| 4,261,496 A | 4/1981 | Mareydt et al. |
| 4,274,569 A | 6/1981 | Winter et al. |
| 4,310,951 A | 1/1982 | Riedel |
| 4,326,320 A | 4/1982 | Riedel |
| 4,386,709 A | 6/1983 | Graber |
| 4,400,038 A | 8/1983 | Hosokawa |
| 4,424,636 A | 1/1984 | Everest |
| 4,433,786 A | 2/1984 | Wahl |
| 4,442,961 A | 4/1984 | Bott |
| 4,453,290 A | 6/1984 | Riedel |
| 4,469,257 A | 9/1984 | Parker |
| 4,473,176 A | 9/1984 | Harper |
| 4,501,354 A | 2/1985 | Hoffman |
| 4,547,980 A | 10/1985 | Olivieri |
| 4,553,292 A | 11/1985 | Pradier et al. |
| 4,555,830 A | 12/1985 | Petrini et al. |
| 4,596,080 A | 6/1986 | Benoit et al. |
| 4,614,047 A | 9/1986 | Arieh et al. |
| 4,616,771 A | 10/1986 | Heideman |
| 4,619,122 A | 10/1986 | Simpson |
| 4,621,873 A | 11/1986 | Weinstein et al. |
| 4,624,063 A | 11/1986 | Delery |
| 4,629,104 A | 12/1986 | Jacquet |
| 4,646,401 A | 3/1987 | Morell |
| 4,670,946 A | 6/1987 | Olivieri |
| 4,678,147 A | 7/1987 | Barnes et al. |
| 4,683,620 A | 8/1987 | Valsecchi et al. |
| 4,694,666 A | 9/1987 | Bellingham et al. |
| 4,702,401 A | 10/1987 | Graber et al. |
| 4,724,692 A | 2/1988 | Turin et al. |
| 4,727,630 A | 3/1988 | Alan |
| 4,728,019 A | 3/1988 | Olliges |
| 4,735,350 A | 4/1988 | Kamaya |
| 4,759,137 A | 7/1988 | Lederer |
| 4,761,859 A | 8/1988 | Calabrigo |
| 4,761,898 A | 8/1988 | Courvoisier et al. |
| 4,763,957 A | 8/1988 | Poehlmann et al. |
| 4,770,011 A | 9/1988 | Constant |
| 4,789,206 A | 12/1988 | Ozaki |
| 4,796,337 A | 1/1989 | Marxer |
| 4,842,148 A | 6/1989 | Bowman |
| 4,887,754 A | 12/1989 | Boyer et al. |
| 4,912,817 A | 4/1990 | Sandreid |
| 4,934,572 A | 6/1990 | Bowman et al. |
| 4,938,475 A | 7/1990 | Sargeant et al. |
| 4,951,487 A | 8/1990 | Sheils Dennis |
| 4,964,287 A | 10/1990 | Gaul |
| 5,003,711 A | 4/1991 | Nerrinck et al. |
| 5,005,390 A | 4/1991 | Giannini et al. |
| 5,007,260 A | 4/1991 | Sharp |
| 5,007,568 A | 4/1991 | Da Vault |
| 5,009,350 A | 4/1991 | Schill et al. |
| 5,014,890 A | 5/1991 | Perry |
| 5,020,708 A | 6/1991 | Kalbach |
| 5,022,672 A | 6/1991 | Kawai |
| 5,027,628 A | 7/1991 | De Rocher et al. |
| 5,037,019 A | 8/1991 | Sokn |
| 5,042,705 A | 8/1991 | Johansson |
| 5,052,605 A | 10/1991 | Johansson |
| 5,065,921 A | 11/1991 | Mobley |
| 5,067,644 A | 11/1991 | Coleman |
| 5,083,350 A | 1/1992 | Sandreid |
| 5,092,504 A | 3/1992 | Hannes et al. |
| 5,118,125 A | 6/1992 | Plunkett |
| 5,119,980 A | 6/1992 | Grim et al. |
| 5,127,564 A | 7/1992 | Romero |
| 5,135,330 A | 8/1992 | Chen |
| 5,165,762 A | 11/1992 | Phillips |
| 5,169,044 A | 12/1992 | Englander |
| 5,172,454 A | 12/1992 | Martignago |
| 5,193,254 A | 3/1993 | Geisinger |
| 5,201,911 A | 4/1993 | Lee |
| 5,203,484 A | 4/1993 | Englander |
| 5,226,341 A | 7/1993 | Shores |
| 5,232,134 A | 8/1993 | Allen |
| 5,253,792 A | 10/1993 | Foster et al. |
| 5,265,897 A | 11/1993 | Stephens |
| 5,275,319 A | 1/1994 | Ruana |
| 5,288,001 A | 2/1994 | Locarno |
| 5,291,763 A | 3/1994 | Cuisinot |
| 5,314,104 A | 5/1994 | Lee |
| 5,316,192 A | 5/1994 | Ng |
| 5,357,690 A | 10/1994 | Ho |
| 5,362,173 A | 11/1994 | Ng |
| 5,377,886 A | 1/1995 | Sickler |
| 5,390,840 A | 2/1995 | Arvidsson |
| 5,416,952 A | 5/1995 | Dodge |
| 5,419,479 A * | 5/1995 | Evels ............... B60R 9/045 224/309 |
| 5,426,826 A | 6/1995 | Takimoto |
| 5,427,286 A | 6/1995 | Hagerty |
| 5,435,475 A | 7/1995 | Hudson et al. |
| 5,456,397 A | 10/1995 | Pedrini |
| 5,476,200 A | 12/1995 | Wong |
| 5,479,836 A | 1/1996 | Chang |
| 5,492,258 A | 2/1996 | Brunner |
| 5,499,430 A | 3/1996 | Strazar |
| 5,511,894 A | 4/1996 | Ng |
| 5,516,020 A | 5/1996 | Lawler et al. |
| 5,526,555 A | 6/1996 | Battistella et al. |
| 5,526,971 A | 6/1996 | Despain |
| 5,556,221 A * | 9/1996 | Brunner ............... B60R 9/045 224/321 |
| 5,560,498 A | 10/1996 | Porter |
| 5,560,666 A | 10/1996 | Vieira et al. |
| 5,570,825 A | 11/1996 | Cona |
| 5,573,165 A | 11/1996 | Bloemer et al. |
| 5,579,972 A | 12/1996 | Despain |
| 5,582,044 A | 12/1996 | Bolich |
| 5,598,959 A | 2/1997 | Lorensen et al. |
| 5,611,472 A | 3/1997 | Miller |
| 5,624,063 A | 4/1997 | Ireland |
| 5,690,259 A | 11/1997 | Montani |
| 5,692,659 A | 12/1997 | Reeves |
| 5,699,684 A | 12/1997 | Sulin |
| 5,699,945 A | 12/1997 | Micklish |

(56) References Cited

U.S. PATENT DOCUMENTS

| | | | |
|---|---|---|---|
| 5,709,521 A | 1/1998 | Glass et al. | |
| 5,730,343 A | 3/1998 | Settelmayer | |
| 5,738,258 A | 4/1998 | Farrow et al. | |
| 5,745,959 A | 5/1998 | Dodge | |
| 5,749,694 A | 5/1998 | Ackerman et al. | |
| 5,752,298 A | 5/1998 | Howell | |
| 5,762,248 A | 6/1998 | Englander et al. | |
| 5,769,292 A | 6/1998 | Cucheran et al. | |
| 5,775,555 A | 7/1998 | Bloemer et al. | |
| 5,779,116 A | 7/1998 | Rösch et al. | |
| 5,820,002 A | 10/1998 | Allen | |
| 5,833,074 A | 11/1998 | Phillips | |
| 5,845,827 A | 12/1998 | Reising | |
| 5,845,828 A * | 12/1998 | Settelmayer | B60R 9/045 224/321 |
| 5,862,964 A | 1/1999 | Moliner | |
| 5,875,947 A | 3/1999 | Noel et al. | |
| 5,924,614 A | 7/1999 | Kuntze et al. | |
| 5,988,402 A | 11/1999 | Mayfield | |
| 6,036,069 A | 3/2000 | Sayegh | |
| 6,053,336 A | 4/2000 | Reeves | |
| 6,062,450 A | 5/2000 | Noel et al. | |
| 6,079,601 A | 6/2000 | Murray | |
| 6,112,965 A | 9/2000 | Lundgren | |
| 6,167,735 B1 | 1/2001 | Brown | |
| 6,283,310 B1 | 9/2001 | Dean et al. | |
| 6,382,480 B1 | 5/2002 | Egly et al. | |
| 6,401,502 B1 | 6/2002 | Yang | |
| 6,422,441 B1 | 7/2002 | Settelmayer et al. | |
| 6,425,509 B1 | 7/2002 | Dean et al. | |
| 6,460,708 B2 | 10/2002 | Dean et al. | |
| 6,460,743 B2 | 10/2002 | Edgerly et al. | |
| 6,494,351 B1 | 12/2002 | Dean | |
| 6,561,398 B1 | 5/2003 | Cole et al. | |
| RE38,162 E | 7/2003 | Brown | |
| 6,601,712 B2 | 8/2003 | Dean et al. | |
| 6,681,971 B2 | 1/2004 | Laverack et al. | |
| 6,684,667 B2 | 2/2004 | Young | |
| 6,736,300 B2 | 5/2004 | Deakin | |
| 6,748,630 B2 | 6/2004 | Livingston | |
| 6,758,380 B1 | 7/2004 | Kolda | |
| 6,793,186 B2 | 9/2004 | Pedersen | |
| 6,851,590 B2 | 2/2005 | Dean | |
| 6,938,782 B2 | 9/2005 | Dean et al. | |
| 6,997,657 B1 | 2/2006 | Saward | |
| 7,004,365 B2 | 2/2006 | Ingram | |
| 7,108,163 B1 | 9/2006 | Pedrini | |
| 7,237,704 B2 | 7/2007 | Dean | |
| D561,680 S | 2/2008 | Foley et al. | |
| D562,217 S | 2/2008 | Davis et al. | |
| 7,357,283 B2 | 4/2008 | Settelmayer | |
| 7,726,528 B2 | 6/2010 | Foley | |
| 7,726,529 B2 | 6/2010 | Foley | |
| 7,726,725 B2 | 6/2010 | Thelen et al. | |
| 7,757,914 B2 | 7/2010 | Book et al. | |
| D622,208 S | 8/2010 | Sautter et al. | |
| 8,136,709 B2 | 3/2012 | Jeli et al. | |
| 8,196,789 B2 | 6/2012 | Kraeuter et al. | |
| 8,210,407 B2 | 7/2012 | Sautter et al. | |
| 8,297,570 B2 | 10/2012 | Noyes | |
| 8,505,793 B2 | 8/2013 | Foley | |
| 9,283,884 B2 | 3/2016 | Sautter et al. | |
| 9,376,065 B2 * | 6/2016 | Budd | B60R 9/10 |
| 10,112,547 B2 * | 10/2018 | Detweiler | B60R 9/10 |
| 2002/0026816 A1 | 3/2002 | Katsouros et al. | |
| 2002/0053581 A1 | 5/2002 | Peschmann et al. | |
| 2002/0125282 A1 | 9/2002 | Laverack et al. | |
| 2003/0080267 A1 | 5/2003 | Eslick | |
| 2003/0146257 A1 | 8/2003 | Dean | |
| 2006/0054573 A1 | 3/2006 | Dean et al. | |
| 2006/0060622 A1 | 3/2006 | Prenger | |
| 2006/0237500 A1 | 10/2006 | Settelmayer | |
| 2006/0249466 A1 | 11/2006 | Wang | |
| 2007/0012738 A1 | 1/2007 | Grim | |
| 2007/0119877 A1 | 5/2007 | Foley | |
| 2007/0164065 A1 * | 7/2007 | Davis | B60R 9/048 224/324 |
| 2007/0210127 A1 | 9/2007 | Book et al. | |
| 2007/0235489 A1 | 10/2007 | Jeli et al. | |
| 2008/0053926 A1 | 3/2008 | Foley | |
| 2008/0164292 A1 | 7/2008 | Farney | |
| 2009/0184189 A1 | 7/2009 | Soderberg et al. | |
| 2009/0236382 A1 | 9/2009 | Sautter et al. | |
| 2010/0078454 A1 | 4/2010 | Sautter et al. | |
| 2011/0139839 A1 | 6/2011 | Foley | |
| 2011/0139841 A1 | 6/2011 | Sautter et al. | |
| 2013/0062379 A1 | 3/2013 | Sautter et al. | |
| 2014/0143990 A1 | 5/2014 | Sautter et al. | |
| 2014/0144960 A1 | 5/2014 | Condon et al. | |
| 2015/0028076 A1 | 1/2015 | Budd et al. | |
| 2015/0210222 A1 | 7/2015 | Kisaka et al. | |
| 2016/0023615 A1 | 1/2016 | Detweiler et al. | |
| 2016/0362053 A1 | 12/2016 | Sautter et al. | |

FOREIGN PATENT DOCUMENTS

| | | |
|---|---|---|
| DE | 3034750 A1 | 4/1982 |
| DE | 3912692 A1 | 11/1989 |
| DE | 4208064 C2 | 8/1993 |
| EP | 0161441 A1 | 11/1985 |
| EP | 0220784 A1 | 5/1987 |
| EP | 0224288 A1 | 6/1987 |
| EP | 1299263 B1 | 3/2006 |
| FR | 2221329 A1 | 10/1974 |
| FR | 2251187 A5 | 6/1975 |
| FR | 2332155 A1 | 6/1977 |
| FR | 2420454 A1 | 10/1979 |
| FR | 2428545 A1 | 1/1980 |
| FR | 2633569 A1 | 1/1990 |
| GB | 2303344 A | 2/1997 |
| IT | 1189908 B | 2/1988 |
| IT | 1236808 B | 4/1993 |
| JP | 10138847 A | 5/1998 |
| WO | 9708017 A1 | 3/1997 |
| WO | 9810959 A1 | 3/1998 |
| WO | 0138141 A1 | 5/2001 |
| WO | 0192062 A1 | 12/2001 |
| WO | 2004076237 A1 | 9/2004 |
| WO | 2009158358 A1 | 12/2009 |
| WO | 2013040267 A1 | 3/2013 |

OTHER PUBLICATIONS

Yakima Products, Inc., Locking Ski Mount Literature, Jan. 1989, 1 page.

Yakima Products, Inc., The New Yakima Over-Center Wheel Strap Literature, Jan. 1989, 1 page.

Bike Racks Plus, Roof Mounted Bike Racks sold by Bike Racks Plus. [Retrieved on Mar. 27, 2007], © 2002-2005 Retrieved from the Internet <URL:http://bike-racks-plus.com/RoofMounted Bike Rack.htm>, 3 pages.

Thule, U.S.A., 535xt Classic Fork Mount Instructions, undated, 5 pages.

* cited by examiner

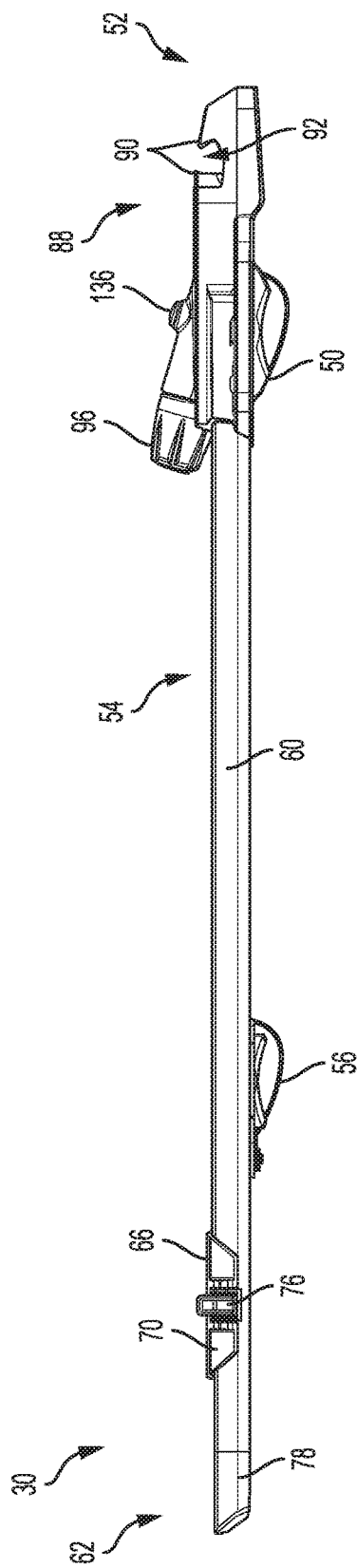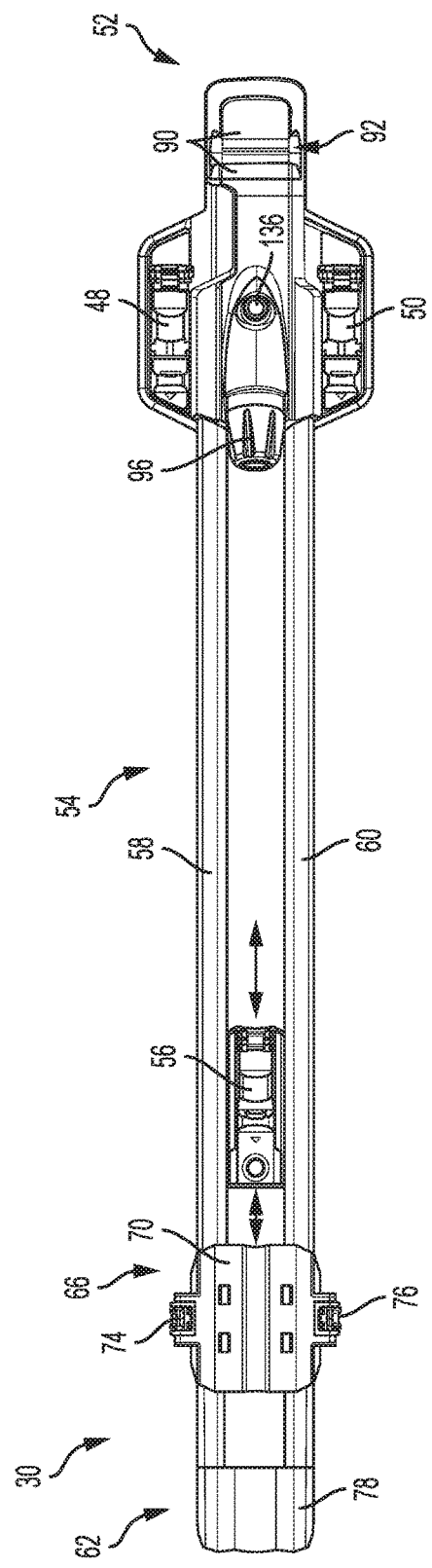

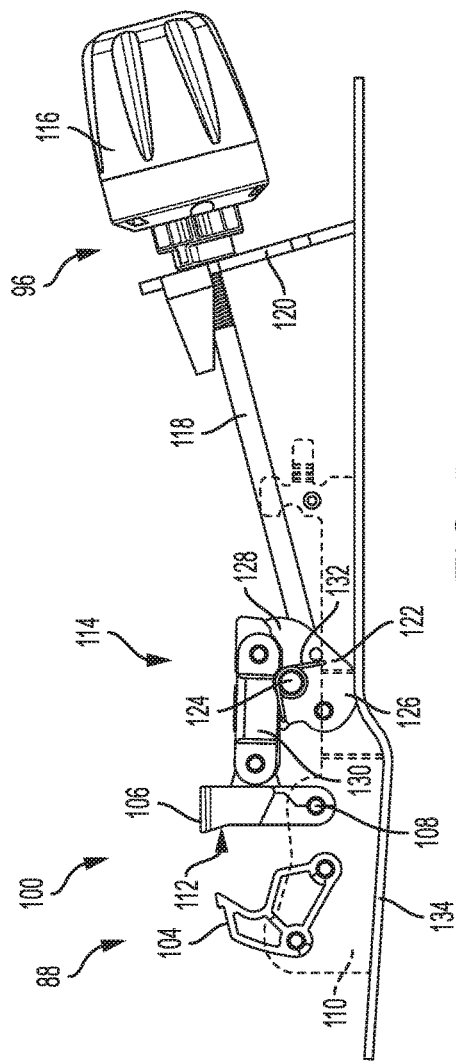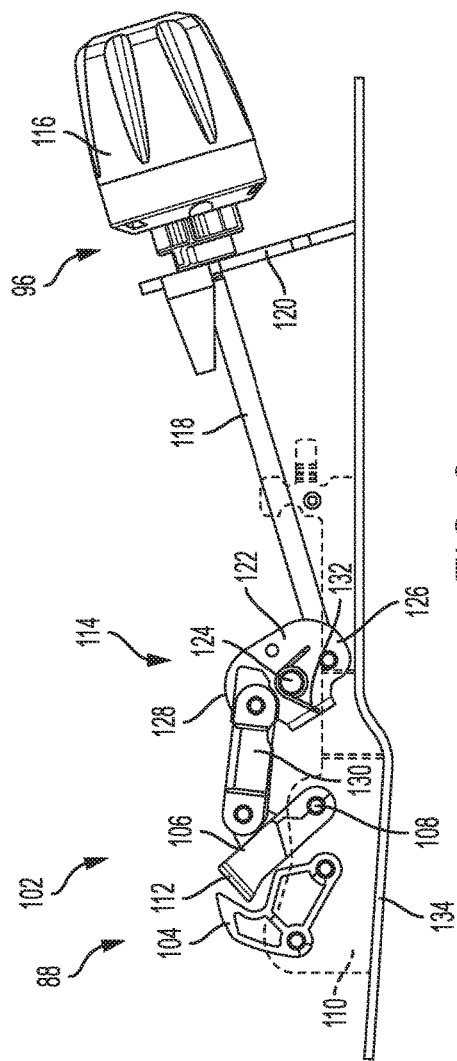

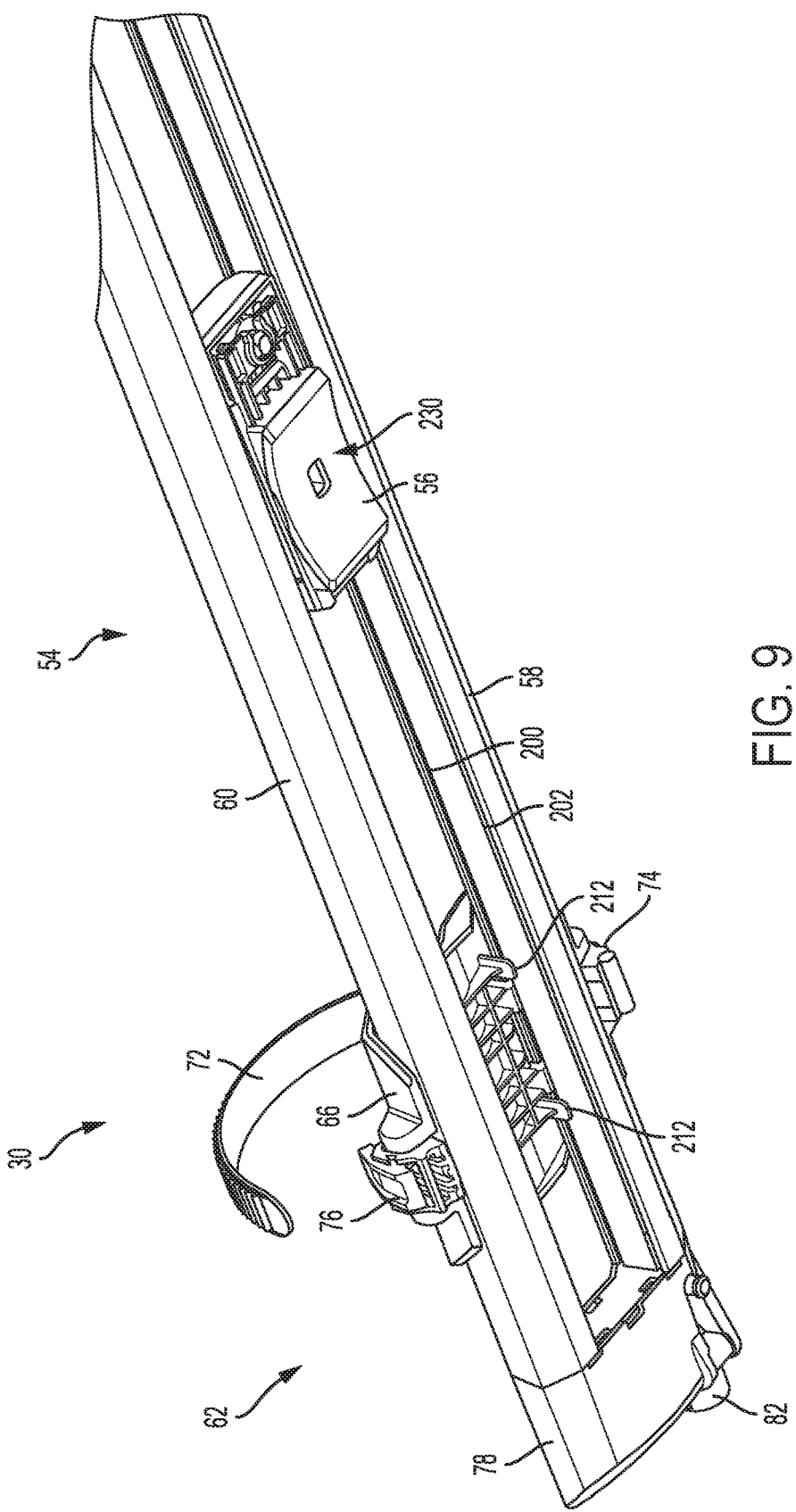

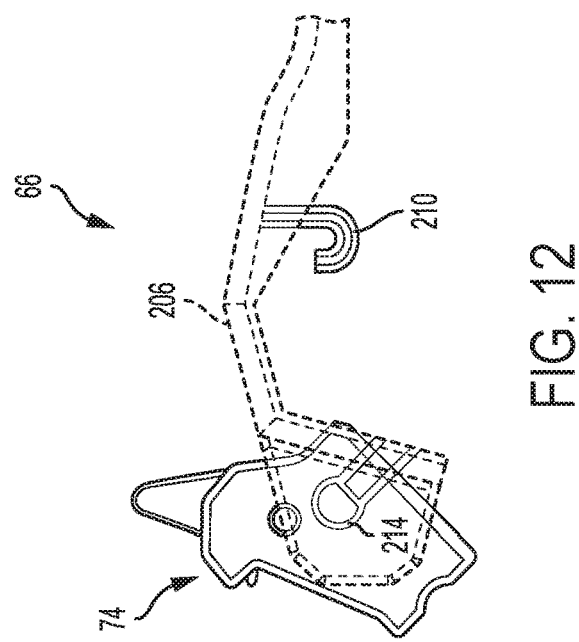
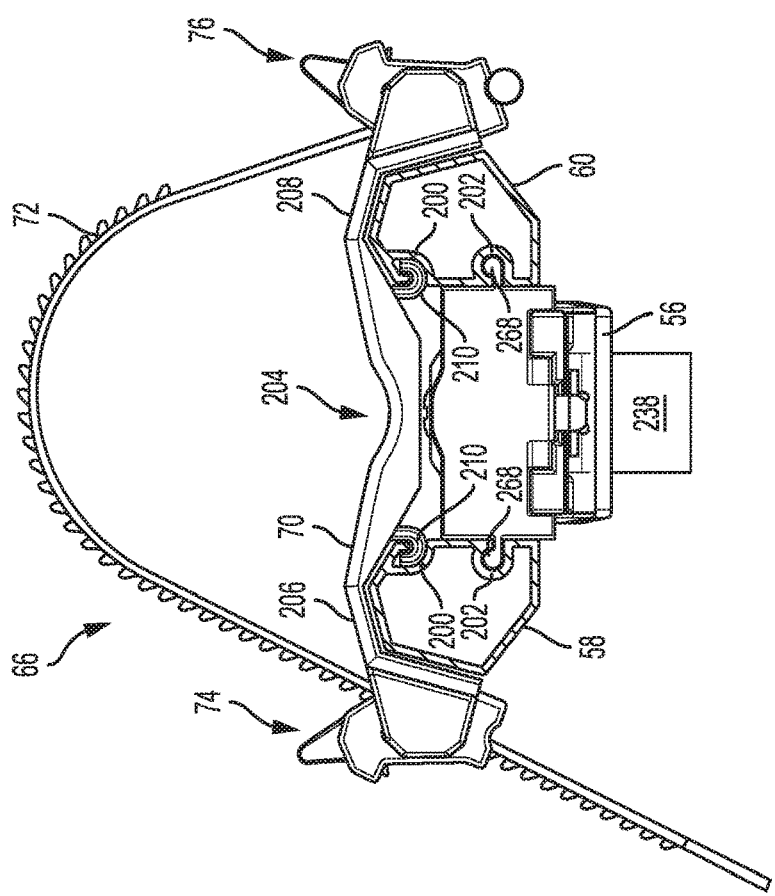
FIG. 12
FIG. 11

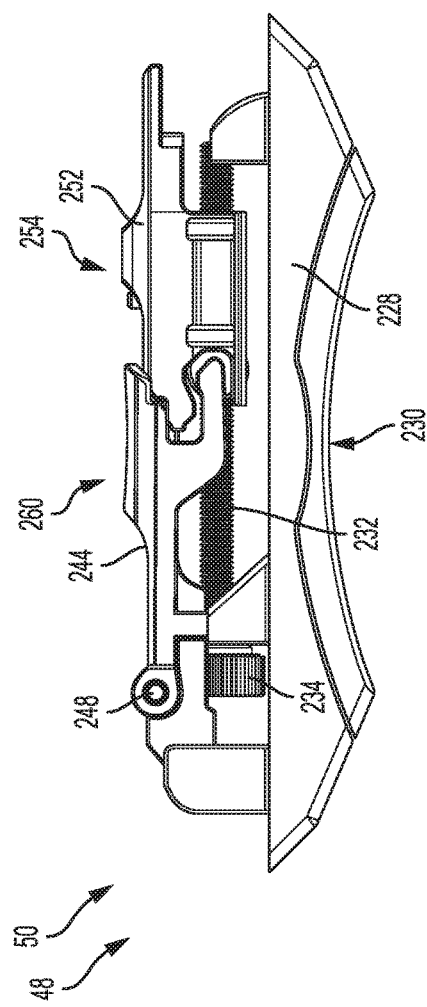
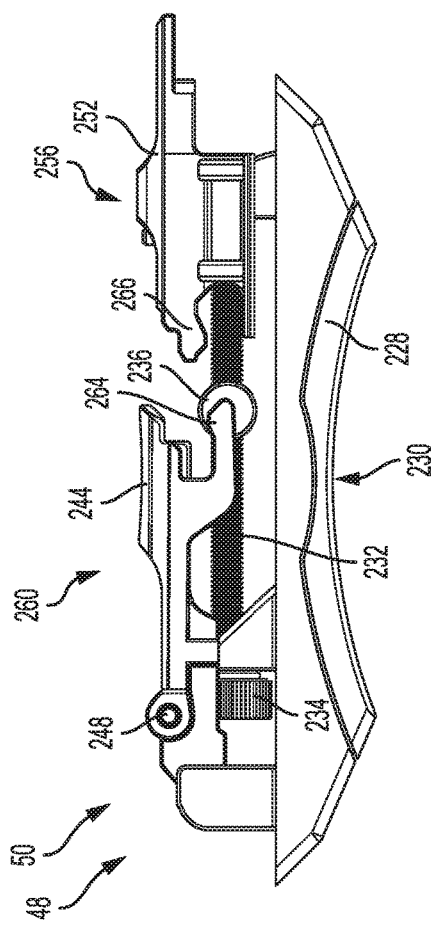

FORK-MOUNT BICYCLE CARRIER

CROSS-REFERENCES

This application claims the benefit under 35 U.S.C. § 119(e) of the priority of U.S. Provisional Patent Application Ser. No. 62/345,837, filed Jun. 5, 2016, the entirety of which is hereby incorporated by reference for all purposes.

The following related applications and materials are incorporated herein, in their entireties, for all purposes: U.S. Pat. No. 6,851,590; U.S. Pat. No. 6,938,782; and U.S. Pat. No. 8,505,793.

INTRODUCTION

The popularity of recreational and competitive cycling has grown substantially in recent years, with a corresponding expansion in the number of different bike designs and configurations. As a result, the demand for bicycle carriers to transport bikes of varying dimensions and designs on cars and other vehicles also has grown significantly.

Various types of vehicle-mounted bicycle carriers are available. One type includes a mount for securing the front fork of a bicycle after having removed the bicycle's front wheel. Typical designs for securing a fork are configured to accept the drop-outs of a standard 9 mm fork, and to secure the fork by clamping it to the mount, for example using a quick-release skewer. Newer fork designs that include through-holes for larger (e.g., 15 mm) front axles as opposed to drop-outs (e.g., the 15QR design) often require an adapter to allow the fork to be secured to the mount.

SUMMARY

The present disclosure provides systems, apparatuses, and methods relating to fork mount upright bicycle carriers and related methods.

In some embodiments, a bicycle mount for carrying a bicycle on a vehicle rack may include: an elongate base having a first end portion, a second end portion, and a pair of rails running generally parallel to a long axis of the base between the first end portion and the second end portion; at least one clamp device coupled to the base and configured to clamp onto a crossbar disposed on a vehicle; a fork mount device coupled to the first end portion of the base, the fork mount device configured to receive a transverse portion of a fork of a bicycle and including: an anvil jaw fixed relative to the base and configured to receive the transverse portion of the fork; a clamping jaw pivotable on a first axle between a release position, in which a distal end of the clamping jaw is pivoted away from the anvil jaw, and a clamping position, in which the distal end of the clamping jaw is pivoted toward the anvil jaw; a linkage assembly including a lever member rotatable on a fulcrum disposed between an actuator end and a load end of the lever member, and a link member pivotably coupling the load end of the lever member to the clamping jaw; and a rotary actuator including a threaded rod having a proximal end coupled to the actuator end of the lever member and a rotatable knob configured to change an effective length of the threaded rod, pivoting the lever member and urging the clamping jaw between the release position and the clamping position.

In some embodiments, a bicycle mount for carrying a bicycle on a vehicle rack may include: an elongate base having a front portion, a rear portion, and at least one rail running generally parallel to a long axis of the base between the front portion and the rear portion; at least one crossbar clamp coupled to the base and configured to clamp onto a crossbar mounted on a vehicle rooftop; a bicycle fork-securing device coupled to the front portion of the base, the bicycle fork-securing device configured to receive a transverse member of a fork of a bicycle and including: a first jaw fixed relative to the base and configured to receive the transverse member of the fork; a second jaw pivotable on a first axis between a release position, in which a distal end of the second jaw is pivoted away from the first jaw, and a clamping position, in which the distal end of the second jaw is pivoted toward the first jaw; and a linkage coupling the second jaw to a rotary actuator configured to urge the second jaw between the release position and the clamping position; wherein the rotary actuator includes a threaded rod having a proximal end coupled to the linkage and a distal end coupled to a rotatable knob adjacent an abutment plate, such that the abutment plate prevents movement of the knob toward the linkage and rotation of the rotatable knob changes an effective length of the threaded rod.

In some embodiments, a bicycle carrier may include: a pair of crossbars; first and second pairs of crossbar-to-vehicle couplers configured to secure the crossbars on top of a vehicle, wherein the crossbars are parallel to each other and perpendicular to a long axis of the vehicle; an elongate carrier base having first and second end portions and configured for mounting on the crossbars such that a long axis of the carrier base is perpendicular to the crossbars; a rear wheel receiver adjustably coupled to the carrier base adjacent the second end portion; and a fork mount device coupled to the carrier base adjacent the first end portion; wherein the fork mount device includes: a first jaw and a second jaw configured to clamp a transverse portion of a front fork of a bicycle therebetween; the second jaw pivotable toward and away from the first jaw on an axle oriented transverse to the long axis of the carrier base; and a linkage configured to convert linear motion of an actuator rod into pivoting motion of the second jaw, wherein the actuator rod is pivotably coupled to the linkage and in adjustably threaded engagement with a manually-rotatable member.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is a side elevation view of the fork-mount upright bicycle carrier of FIG. 1.

FIG. 4 is a top plan view of the fork-mount upright bicycle carrier of FIG. 1.

FIG. 5 is a side elevation view of selected components of an illustrative fork mount device in a released or open configuration, in accordance with aspects of the present disclosure.

FIG. 6 is a side elevation view of the components of FIG. 3, in a clamping or closed configuration, in accordance with aspects of the present disclosure.

FIG. 9 is a bottom oblique view of a rear portion of the carrier of FIG. 1.

FIG. 11 is a rear elevation sectional view through rail portions of the carrier of FIG. 1, showing relationships between the rails, the wheel receiver, and a rear crossbar clamp.

FIG. 12 is a partial, semi-transparent view of an illustrative buckle arrangement of a rear wheel receiver of the carrier of FIG. 1.

FIGS. 18 through 20 are side elevation views of various configurations of the clamp of FIG. 17, during a series of operational steps.

DESCRIPTION

Figure 1:
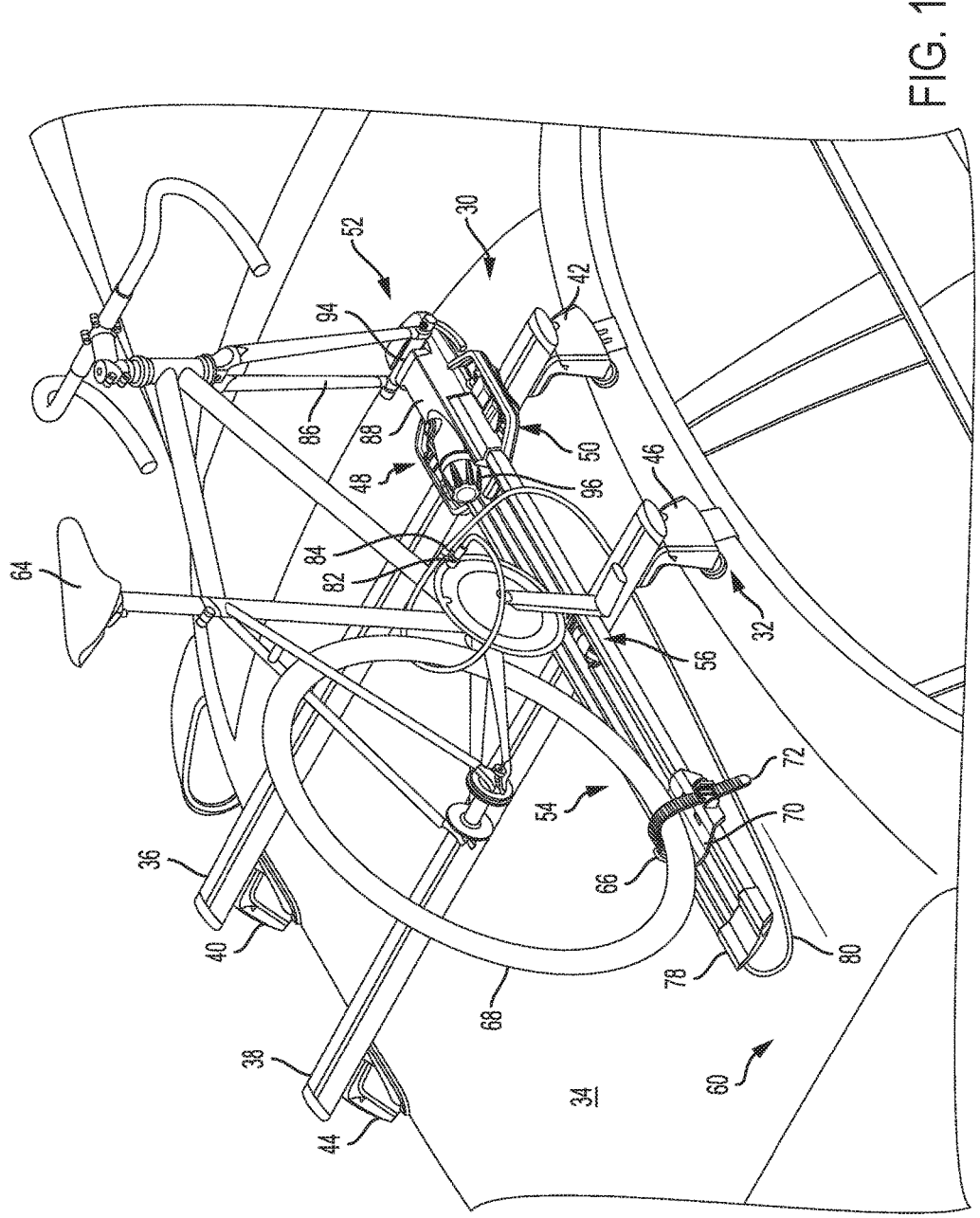
FIG. 1 is an isometric view of an illustrative fork-mount upright bicycle carrier in accordance with aspects of the present disclosure, mounted on a vehicle rooftop and carrying a bicycle thereon.

Various aspects and examples of a fork-mount style upright bicycle carrier, as well as related systems and methods, are described below and illustrated in the associated drawings. Unless otherwise specified, a fork-mount upright bicycle carrier according to the present teachings, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "rear" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rear" means toward the rear of the vehicle. In the absence of a host vehicle, the same directional terms may be used as if the vehicle were present. For example, even when viewed in isolation, a crossbar may have a "forward" edge, based on the fact that the edge in question would be installed based on the fact that the crossbar would be installed with the edge in question facing in the direction of the front portion of the host vehicle.

"Coupled" means connected, either permanently or releasably, whether directly or indirectly through intervening components.

Overview

In general, a fork-mount upright bicycle carrier according to the present teachings may include an elongate base having a first end portion, a second end portion, and a pair of rails running generally parallel to a long axis of the base. The carrier may be clamped to a crossbar of a vehicle rack by at least one crossbar clamp coupled to the base. A fork mount device may be coupled to the first end portion of the base, for receiving a transverse portion (e.g., an axle or skewer) of a fork of the bicycle. As described further below, the fork mount device may include a pair of jaws, namely an anvil jaw that is fixed relative to the base, and a clamping jaw that is pivotable on a first axle between a release position, in which a distal end of the clamping jaw is pivoted away from the anvil jaw, and a clamping position, in which the distal end of the clamping jaw is pivoted toward the anvil jaw (i.e., clamping onto the fork axle/skewer. In some examples, the clamping jaw is pivoted by a linkage assembly. The linkage assembly includes a lever plate rotatable on a fulcrum disposed between an actuator end and a load end of the lever plate, and a link member that pivotably couples the load end of the lever member to the clamping jaw. The fork mount jaws are clamped onto the axle/skewer by a rotary actuator that includes a threaded rod having a proximal end coupled to the actuator end of the lever plate and a rotatable knob configured to change an effective length of the threaded rod. Rotating the knob causes the lever plate to pivot on the fulcrum and urge the clamping jaw between the release position and the clamping position.

Figure 2:
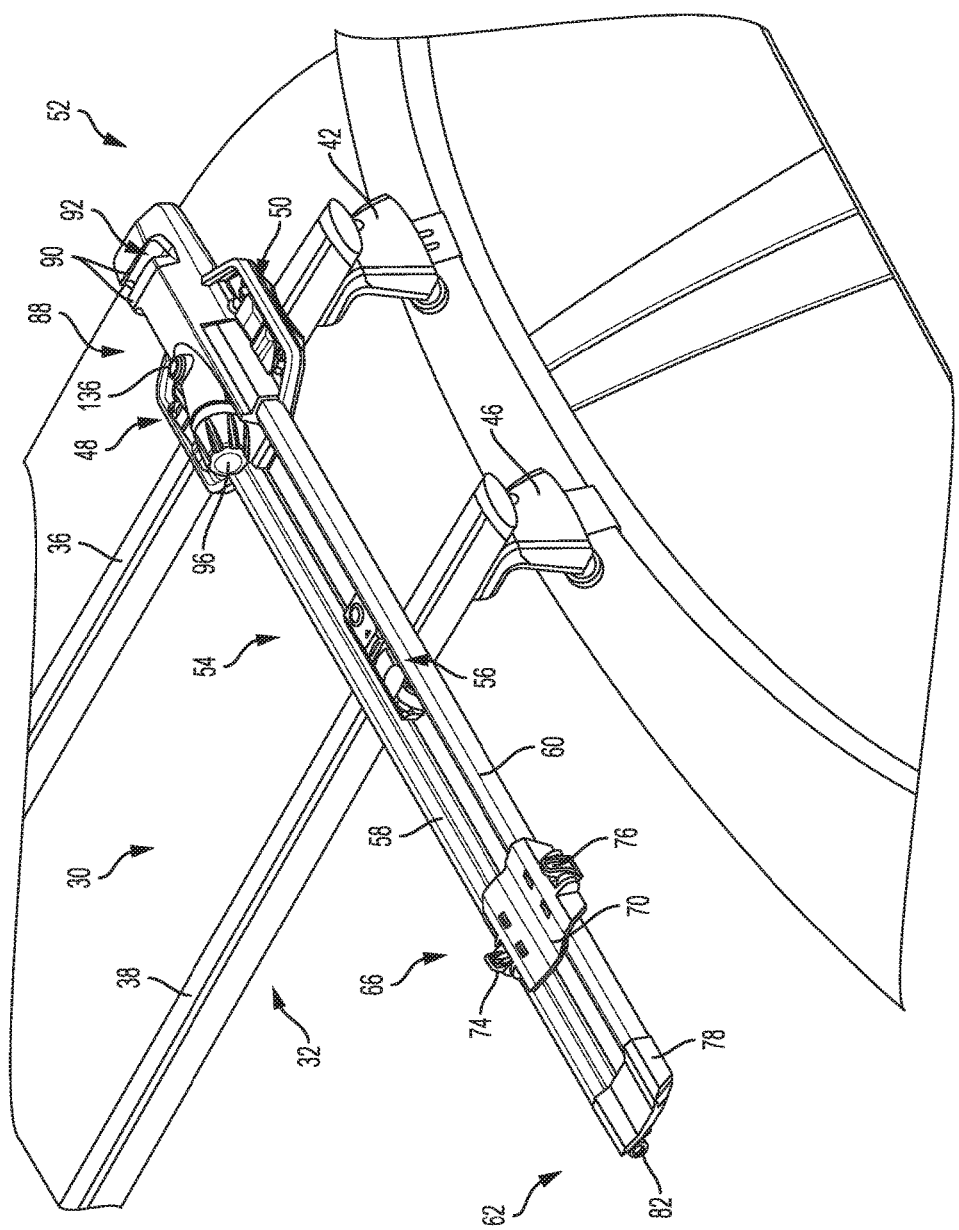
FIG. 2 is an isometric view of the fork-mount upright bicycle carrier of FIG. 1, mounted on the vehicle.

FIGS. 1-4 depict an illustrative fork-mount upright bicycle carrier 30. FIGS. 1 and 2 show the carrier mounted to an illustrative vehicle, FIG. 3 is a side elevation view, and FIG. 4 is an overhead plan view.

FIGS. 1 and 2 depict fork-mount upright bicycle carrier 30 mounted to a rack 32 on a vehicle 34. Rack 32 includes a pair of crossbars (front crossbar 36 and rear crossbar 38)

attached to vehicle 34 by a first pair of crossbar-to-vehicle couplers 40, 42 and a second pair of crossbar-to-vehicle couplers 44, 46, respectively, as shown in FIG. 1. Carrier 30 is clamped to front crossbar 36 by two front crossbar clamps 48 and 50 fixedly coupled to a front end portion 52 of an elongate base 54 of carrier 30. Carrier 30 is also clamped to rear crossbar 38 by a rear crossbar clamp 56 coupled to a pair of rails 58, 60 running generally parallel to a long axis of the base between the front end portion 52 and a rear end portion 62.

A bicycle 64 may be supported in a secure manner on carrier 30, as depicted in FIG. 1. For this purpose, carrier 30 includes a rear wheel receiver 66 for securing a rear wheel 68 of bicycle 64 to base 54. Rear wheel receiver 66 may include any suitable device configured to releasably mount rear wheel 68 to carrier 30. In this example, rear wheel receiver 66 includes a wheel support plate 70 and a ratcheting wheel strap 72 securable to the support plate by lateral buckles 74, 76.

Bicycle 64 may include any suitable bicycle, such that a length of the bicycle may vary from example to example. Similarly, vehicle 34 may comprise any suitable vehicle, such that vehicle shapes and sizes may vary from example to example. For those reasons, crossbars 36 and 38 may be spaced differently depending on the vehicle, and rear wheel receiver 66 may be positioned differently along rails 58 and 60, depending on the bicycle. Accordingly, the rear crossbar clamp and the rear wheel receiver may be independently and adjustably positionable along respective lengths of the carrier base (see FIGS. 3 and 4).

A rear cap portion 78 structurally supports and spaces rails 58 and 60 at rear end 62. In some examples, rear cap portion 78 provides an aperture through which a retractable tether 80 may be retracted into and extended from one of the rails (in this example, rail 58) for securing bicycle 64 to the carrier. As depicted in FIG. 1, tether 80 may include a self-locking feature, in which a first locking portion 82 disposed at the end of the tether is lockable to a second lock portion 84 disposed on the tether. In some examples, a separate lock may be used with tether 80. First locking portion 82 may be received in a seat formed in rear cap portion 78, as depicted in FIG. 2.

A front end of bicycle 64 is also mountable to carrier 30. In this case, a front fork 86 is selectively securable to a fork mount device 88 coupled to front end portion 52. Fork mount device 88 includes a pair of jaws 90 forming an opening 92 for receiving a transverse member 94 of front fork 86. For example, transverse member 94 may include a 15 mm front through-axle of the fork. In dropout-style forks, a separate axle adapter may be provided (see further details below). A rotary actuator 96 may be manipulated by a user to transition jaws 90 between released and clamping positions.

As shown in FIGS. 1-4, front crossbar clamps 48 and 50 are disposed in a fixed location, such that fork mount device 88 and jaws 90 are cantilevered forward of the front crossbar when installed. This extension of the jaw position forward of the front crossbar is advantageous in that it allows rear end 62 to be further forward on vehicle 34, providing clearance for rear vehicle features, such as hatchback doors, etc. In some examples, jaws 90 are at least approximately four inches forward of crossbar clamps 48 and 50. In some examples, this distance is at least approximately five, six, or seven inches.

A. Fork Mount Device

As shown in FIGS. 5-8, this section describes further details regarding fork mount device 88. FIGS. 5 and 6 are side elevation views of fork mount device 88 with an external housing removed to show relationships between selected components. FIG. 5 shows fork mount device 88 in a release configuration 100 (also referred to as a release or released position), and FIG. 6 shows fork mount device 88 in a clamping configuration 102 (also referred to as a clamping or clamped position).

Fork mount device 88 includes jaws 90: an anvil jaw 104 that is fixed relative to base 54, and a clamping jaw 106 that is pivotable toward and away from anvil jaw 104 on a first axis, e.g., on an axle 108. Anvil jaw 104 may be referred to as a first jaw, and clamping jaw 106 may be referred to as a second jaw. Jaws 90 are supported between a pair of side walls 110, one of which is shown in FIGS. 5 and 6. As depicted in FIGS. 5 and 6, a distal end 112 of clamping jaw 106 is pivoted away from anvil jaw 104 in released configuration 100 and toward anvil jaw 104 in clamping configuration 102.

A linkage or linkage assembly 114 couples clamping jaw 106 to rotary actuator 96. Rotary actuator 96 includes a manually rotatable member 116 (e.g., a knob or any other suitable interface) coupled to a threaded actuator rod 118. Member 116 is in threaded engagement with actuator rod 118, but is prevented from moving toward linkage 114 by an abutment plate 120, as depicted in FIGS. 5 and 6. Accordingly, rotation of member 116 causes actuator rod 118 to move axially with respect to member 116 (e.g., into and out of the knob).

Linkage 114 may include any suitable components configured to convert linear (axial) motion of the actuator rod into pivoting motion of clamping jaw 106. In this example, linkage 114 includes a a lever member 122 rotatable on a fulcrum 124 disposed between an actuator end 126 and a load end 128 of the lever member. Linkage 114 also includes a link member 130 pivotably coupling load end 128 of lever member 122 to clamping jaw 106. Lever member 122 may include any suitable link having a pivot point or fulcrum disposed between opposing end portions. In this example, lever member 122 is a plate having its major face oriented substantially perpendicular to its axis of rotation, which comprises fulcrum 124. Fulcrum 124 may also be referred to as a second axle, and may be substantially parallel to first axle 108. In some examples, rotation of lever member 122 may be biased toward either release position 100 or clamping position 102, e.g., using an axle-mounted torsion spring 132.

Accordingly, to transition from release position 100 to clamping position 102, rotatable member 116 is rotated (e.g., clockwise). Member 116 is prevented from axial movement by abutment plate 120, so threaded actuator rod 118 moves axially (i.e., generally rearward) with respect to member 116. This action pulls actuator end 126 rearward, pivoting lever member 122 on fulcrum 124. Pivoting of the lever member causes load end 128 to move in a generally forward direction. Link member 130, which is has a respective pivot joint at either end, transfers this forward motion to clamping jaw 106. Distal end 112 of clamping jaw 106 is therefore urged to pivot forward, toward anvil jaw 104. Tightening of the clamp onto transverse member 94 of the bicycle fork may be limited by a torque-limiting device incorporated into member 116. For example, a pair of slip plates may be utilized to prevent over-torquing.

To transition from clamping position 102 to release position 100, rotatable member 116 is rotated in an opposite direction (e.g., counter-clockwise). Member 116 is generally biased against abutment plate 120 by torsion spring 132, such that threaded actuator rod 118 moves axially ((i.e., generally forward) with respect to member 116. This action pushes actuator end 126 forward, pivoting lever member 122 on fulcrum 124. This pivoting causes load end 128 to move in a generally rearward direction. Link member 130 transfers this rearward motion to clamping jaw 106. Distal end 112 of clamping jaw 106 is therefore urged to pivot rearward, away from anvil jaw 104.

The components of fork mount device 88 may be structurally supported on a base plate 134, which forms a part of base 54 of carrier 30. In some examples, a locking device 136 (not shown in detail) may be coupled to abutment plate 120, for rotationally locking member 116. In other words, a key-operated mechanical stop may be provided to selectively prevent or interfere with rotation of member 116, thereby preventing operation of the clamping jaws.

Figure 8:
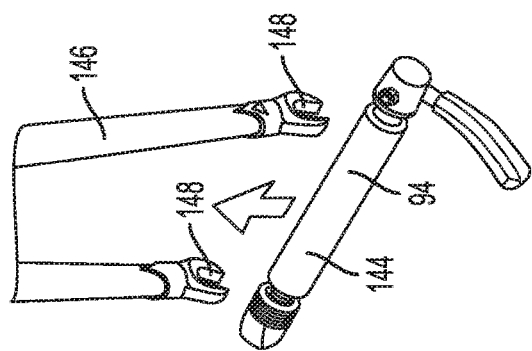
FIG. 8 is a partial oblique isometric view of another illustrative bicycle fork having dropout openings and an illustrative axle adapter for use therein.
Figure 7:
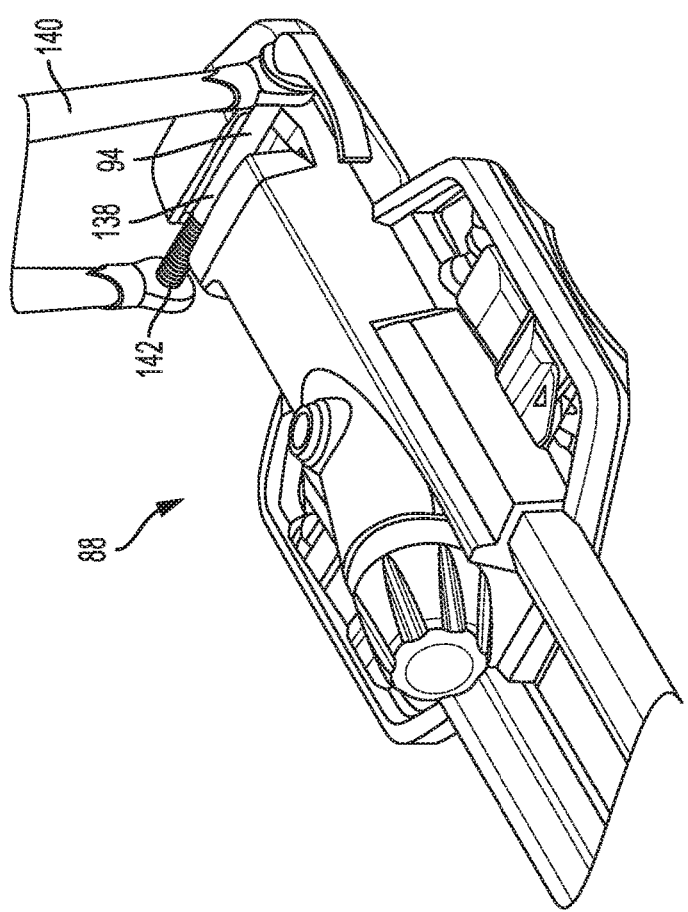
FIG. 7 is a partial oblique isometric view of an illustrative bicycle fork and through-axle inserted into the jaws of a fork mount device according to the present teachings.

Turning to FIGS. 7 and 8, different examples of transverse member 94 will now be described. FIG. 5 shows a through-axle 138 (e.g., a 15 mm axle), on a bicycle fork 140 having through holes 142 rather than dropouts. Through-axle 138 may be the native axle for fork 140, or may be a substitute axle. FIG. 6 shows an axle adapter 144 or skewer for adapting a fork 146 having dropouts 148. Adapter 144 is generally cylindrical, and has a larger (e.g., 15 mm) central portion with thinner portions at the fork interface points. Axle adapter 144 may be provided with carrier 30. Both transverse members may include quick-release clamps for securing the transverse member to the fork. Consistency (e.g., within a range) of the outer diameter of the axle may facilitate clamping performance of jaws 90 and fork mount device 88.

B. Rear Wheel Receiver

As shown in FIGS. 9-12, this section describes further details regarding rear wheel receiver 66 and related features of carrier 30.

FIG. 9 is a bottom oblique view of rear end portion 62 of base 54. As depicted, rails 58 and 60 each include an upper slot 200 and a lower slot 202, each running along a length of the respective rail. Rear crossbar clamp 56 includes side tabs that ride in lower slots 202, forming a sliding or prismatic joint and facilitating lengthwise position adjustment of the clamp. Similarly, rear wheel receiver 66 includes protrusions that ride in upper slots, 200, forming a sliding or prismatic joint and facilitating lengthwise position adjustment of the wheel receiver. The rear clamp and the rear wheel receiver are configured such that the two components do not interfere with each other, so the receiver and clamp can slide past each other in their respective slots, allowing position adjustment within overlapping ranges.

Figure 10:
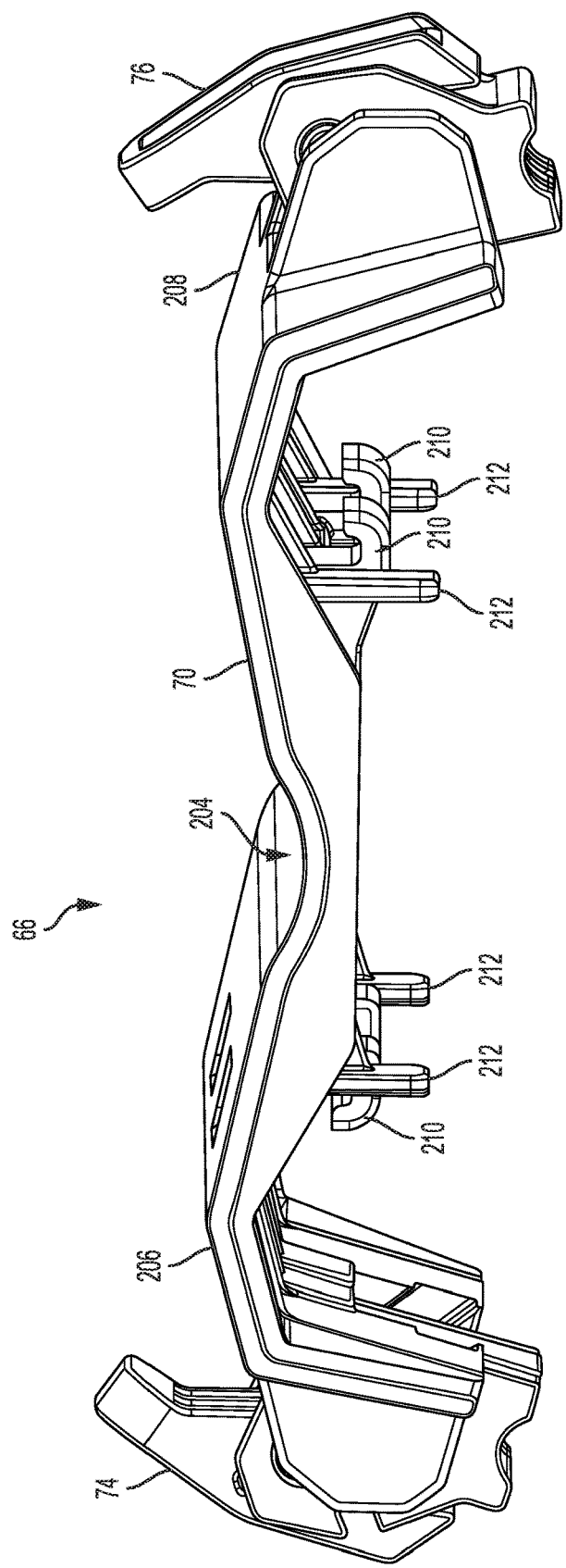
FIG. 10 is an isometric view of an illustrative rear wheel receiver portion suitable for use on the carrier of FIG. 1.
Figure 13:
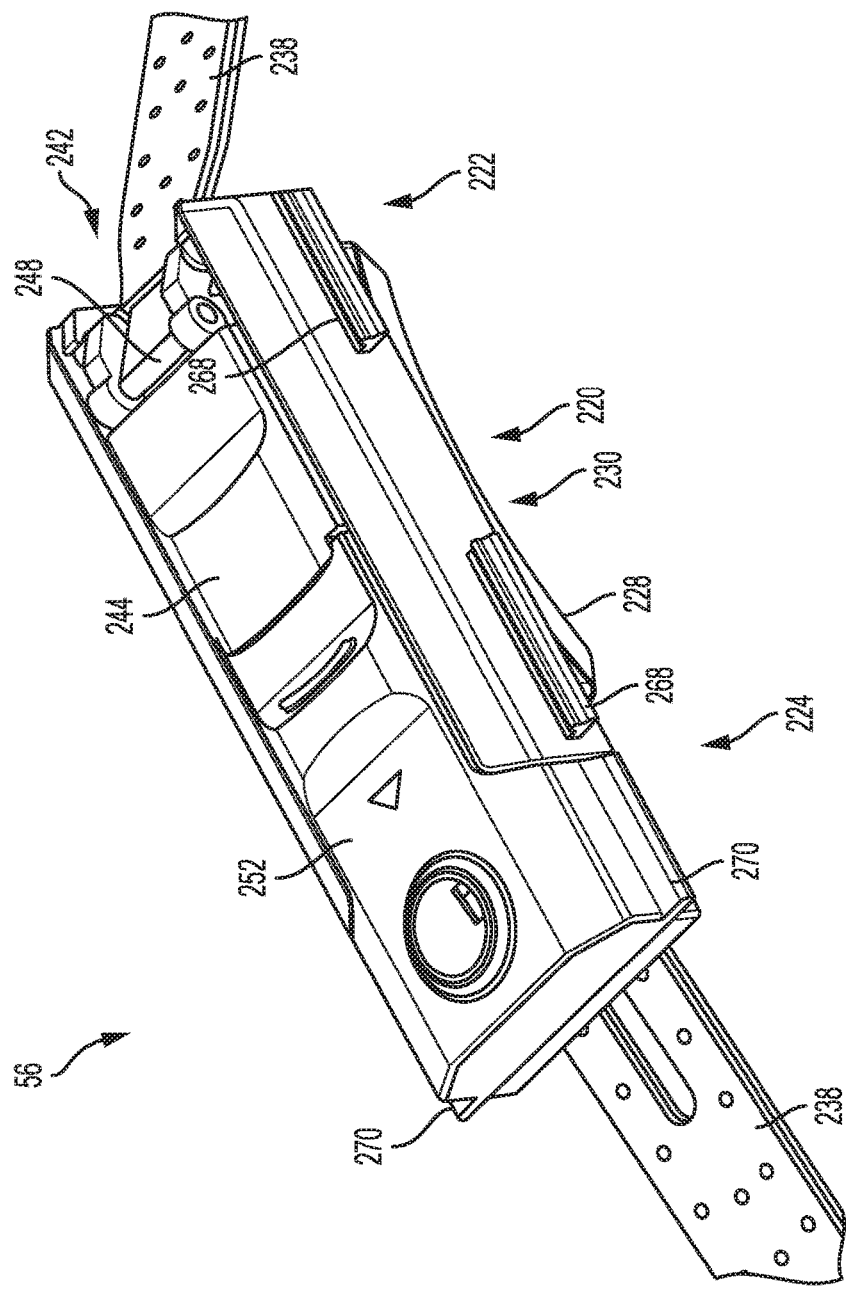
FIG. 13 is an oblique isometric view of an illustrative strap-type crossbar clamp according to the present teachings.

FIG. 10 is an isometric view of an isolated portion of rear wheel receiver 66. The rear wheel receiver includes wheel support plate 70 having a central concavity 204 configured to receive rear wheel 68 of the bicycle thereon. Plate 70 extends laterally outward and downward, forming side wing portions 206 and 208 configured to overlay rails 58 and 60 in sliding contact. Wing portions 206 and 208 also support side buckles 74 and 76 for ratcheting and release of strap 72. On an under-surface of the rear wheel receiver, four protrusions 210 extend downward and outward, two on either side of the centerline. Protrusions 210 may include any suitable structures configured to engage slots 200. In this example, protrusions 210 are J-shaped protrusions or hooks configured to insert into slots 200 and prevent upward movement or removal. The receiver also includes a plurality of alignment tabs 212 adjacent protrusions 210, configured to abut and slide along the inner walls of rails 58 and 60.

FIG. 11 is a sectional view through rails 58 and 60, showing the relationships between rails 58 and 60, slots 200 and 202, and rear wheel receiver 66 and rear crossbar clamp 56. As depicted, rear wheel receiver 66 rides atop rails 58 and 60, and is engaged with the upper slots via protrusions 210. Below the wheel receiver, rear crossbar clamp 56 is engaged with the lower slots via its side tabs, described further below.

FIG. 12 is a partial detail view showing how the strap buckles (in this case buckle 74) are pivotable within their mounts on side wings 206 and 208. An axle portion 214 may, e.g., twist flexibly to permit this pivoting. This feature facilitates securing of a wider range of wheel and tire sizes.

C. Crossbar Clamps

As shown in FIGS. 13-21, this section provides further description regarding front crossbar clamps 48 and 50, as well as rear crossbar clamp 56. FIG. 13-17 depict various features of the clamps Crossbar clamps 48, 50, and 56 of carrier 30 may include any suitable crossbar clamps, including clamshell-style, linear-style, and strap-style clamps. The examples described below are strap-style clamps, but other types of clamps may be used, including a combination of styles. Furthermore, the strap-style of crossbar clamps described below may be used independently of carrier 30, e.g., on a different style or type of bicycle carrier, other equipment carrier, or adapter used with a vehicle rack having crossbars. In general, the strap clamps described herein may be used in any appropriate application.

Figure 17:
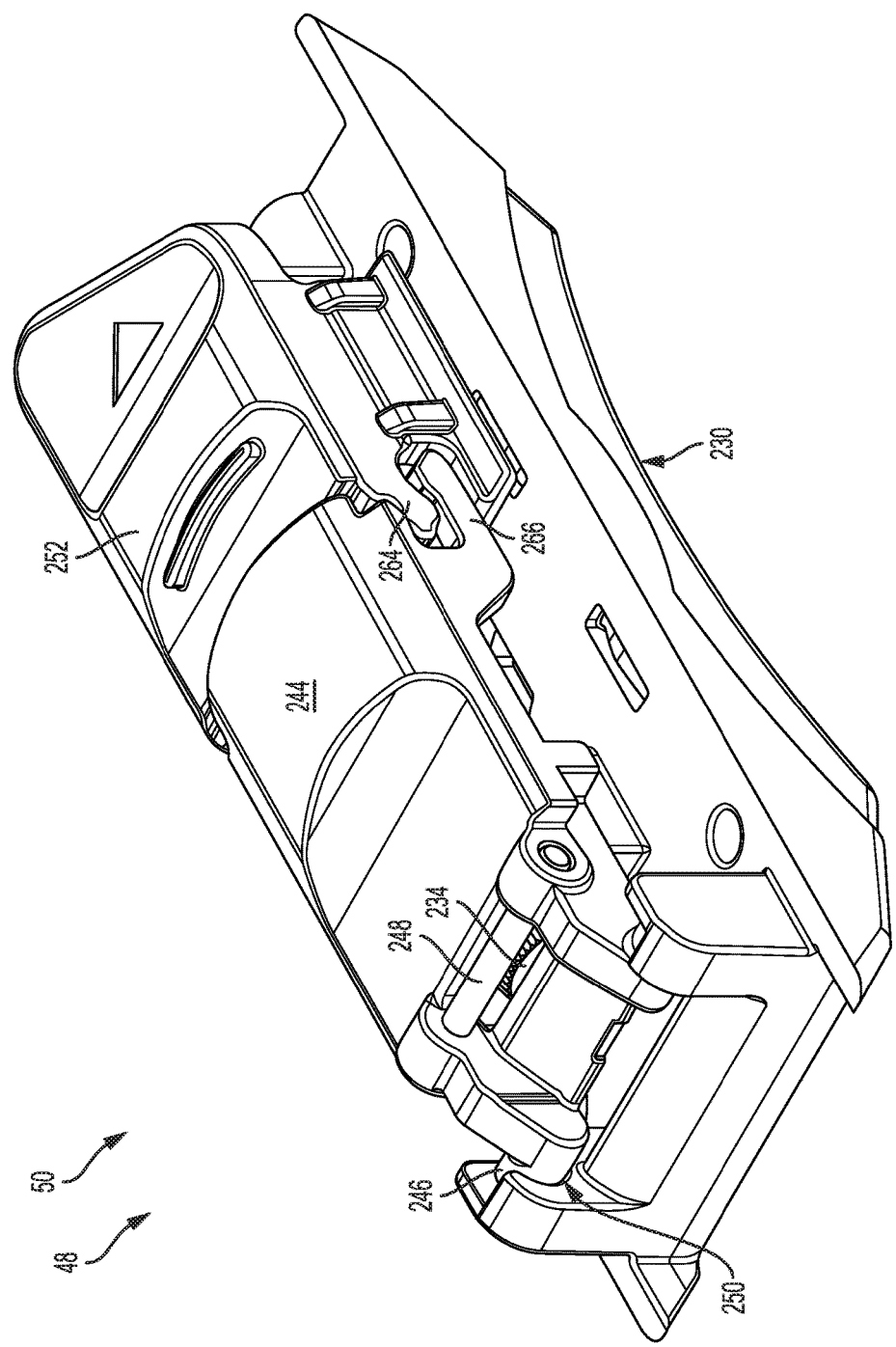
FIG. 17 is oblique isometric view of another illustrative strap-type crossbar clamp according to the present teachings.

FIGS. 13-16 depict various aspects of rear crossbar clamp 56, which comprises a positionable, adjustable, and lockable strap clamp. FIG. 17 shows crossbar clamp 48 (identical to crossbar clamp 50), which does not include the positionable and lockable features of clamp 56. FIGS. 18-21 depict various steps common to the operation of all of these clamps.

With reference to FIGS. 13-21, functionally similar components of crossbar clamps 48, 50, and 56 will be described simultaneously and labeled accordingly. Where crossbar clamp 56 differs from the front crossbar clamps, these differences will be called out and labeled separately. Absent any such specificity, clamps 48, 50, and 56 should be understood to include functionally identical or substantially similar components.

Crossbar clamps 48, 50, 56 each include a body 220 including a first end portion 222, a second end portion 224, an upper portion 226, and a lower portion 228 having a cushioned concave surface 230 configured to contact a top side of the crossbar. A threaded rod 232 is rotatably coupled to upper portion 226 of body 220. Threaded rod 232 has a dial 234 that is manipulable to rotate the rod. A traveling member 236 (e.g., a barrel nut) is in threaded engagement with rod 232 and travels along the rod in response to rotation thereof.

A flexible strap 238 (see especially FIG. 16) has a proximal end 240 coupled to traveling member 236 such that the flexible strap is coupled to the first end portion of the body. Strap 238 has an effective length that can be lengthened or shortened, as described below, to fit the crossbar. A distal end 242 of strap 238 is coupled to a lever plate 244 (also referred to as an over-center plate). Lever plate 244 has a transverse shaft portion 246, which may comprise two lateral extensions. Distal end 242 of strap 238 is pivotally attached to lever plate 244 by a mounting pin 248 disposed adjacent shaft portion 246. Mounting pin 248 is spaced from the shaft portion along a length of the lever plate, facilitating an over-center mechanism when securing the lever plate to body 220. Second end portion 224 of the body includes a slot 250 configured to receive shaft portion 246 of the lever plate for this purpose, such that the lever plate is releasably engageable with the second end portion.

Rotation of dial 234 causes the traveling member to move along rod 232, causing more or less of strap 238 to be housed within body 220, thereby altering the effective length of the strap. This may be done, for example, to adapt strap 238 to differently-sized crossbars. Lever plate 244 is also pivotably transitionable, when shaft portion 246 is seated in slot 250, between an open position 258 and a closed position 260, such that transitioning from the open position to the closed position causes an over-center action and a decrease in the effective length of the flexible strap. This facilitates tightening of the strap around the crossbar.

A cover plate 252 is coupled to first end portion 222 of the body. Cover plate 252 is slidable along the body between a first position 254 and a second position 256. (See FIGS. 18-19). Cover plate 252 blocks lever plate 244 from opening when the lever plate is in closed position 260 and the cover plate is in first position 254. Accordingly, the lever plate is prevented by the cover plate from transitioning to the open position until the cover plate is slid into second position 256. In some examples, respective opposing ends of cover plate 252 and lever plate 244 include finger portions 262 configured to interdigitate when the lever plate is in the closed position and the cover plate is in the first position, such that the cover plate and the lever plate are interlockable. For example, lever plate 244 includes finger portions 264 configured to interlock with finger portions 266 on cover plate 252.

Body 220 includes a pair of side walls 267 extending from the first end portion to the second end portion, the pair of side walls configured to prevent access to threaded rod 232. (Lever plate 244 is also configured to prevent access to the dial and threaded rod). With respect to rear crossbar clamp 56 only, body 220 may include side tabs 268, e.g., on walls 267 (See FIG. 13-15). Side tabs 268 may include any suitable protrusions or other structures configured to interface with lower slots 202 of rails 58 and 60, forming a prismatic or sliding joint. In some examples, side tabs may be reverse-tapered or shaped to facilitate retention of the tabs within the slots. Cover plate 252 may include its own side tabs 270, to retain the cover plate in the slots and to facilitate sliding of the cover plate between first and second positions. This arrangement facilitates adjustability of the position of the clamp device relative to the carrier (or other rack accessory) along a length of the slots. In some examples, only one slot is used. In some examples, only one tab 268 is present.

Figure 14:
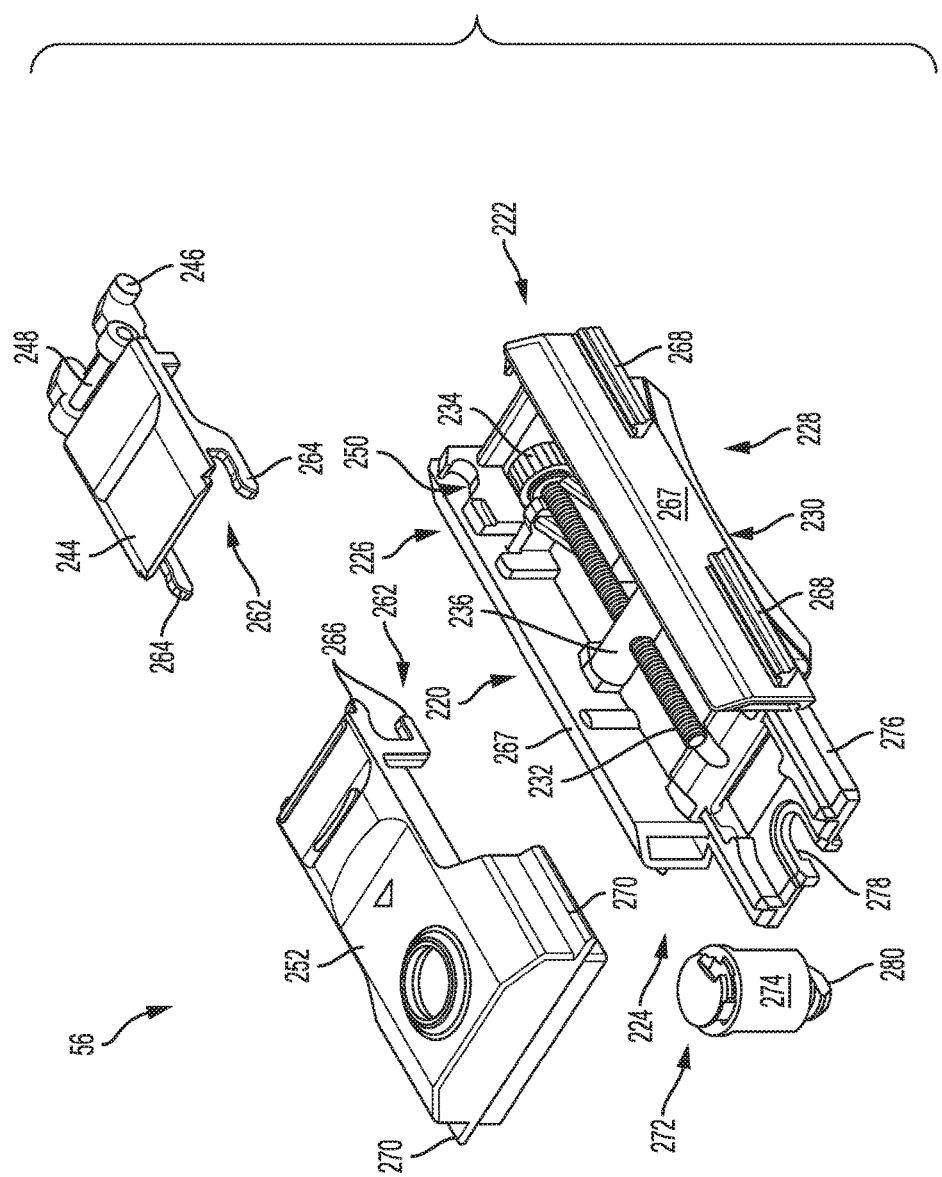
FIG. 14 and FIG. 15 are exploded views of the clamp of FIG. 13.
Figure 15:
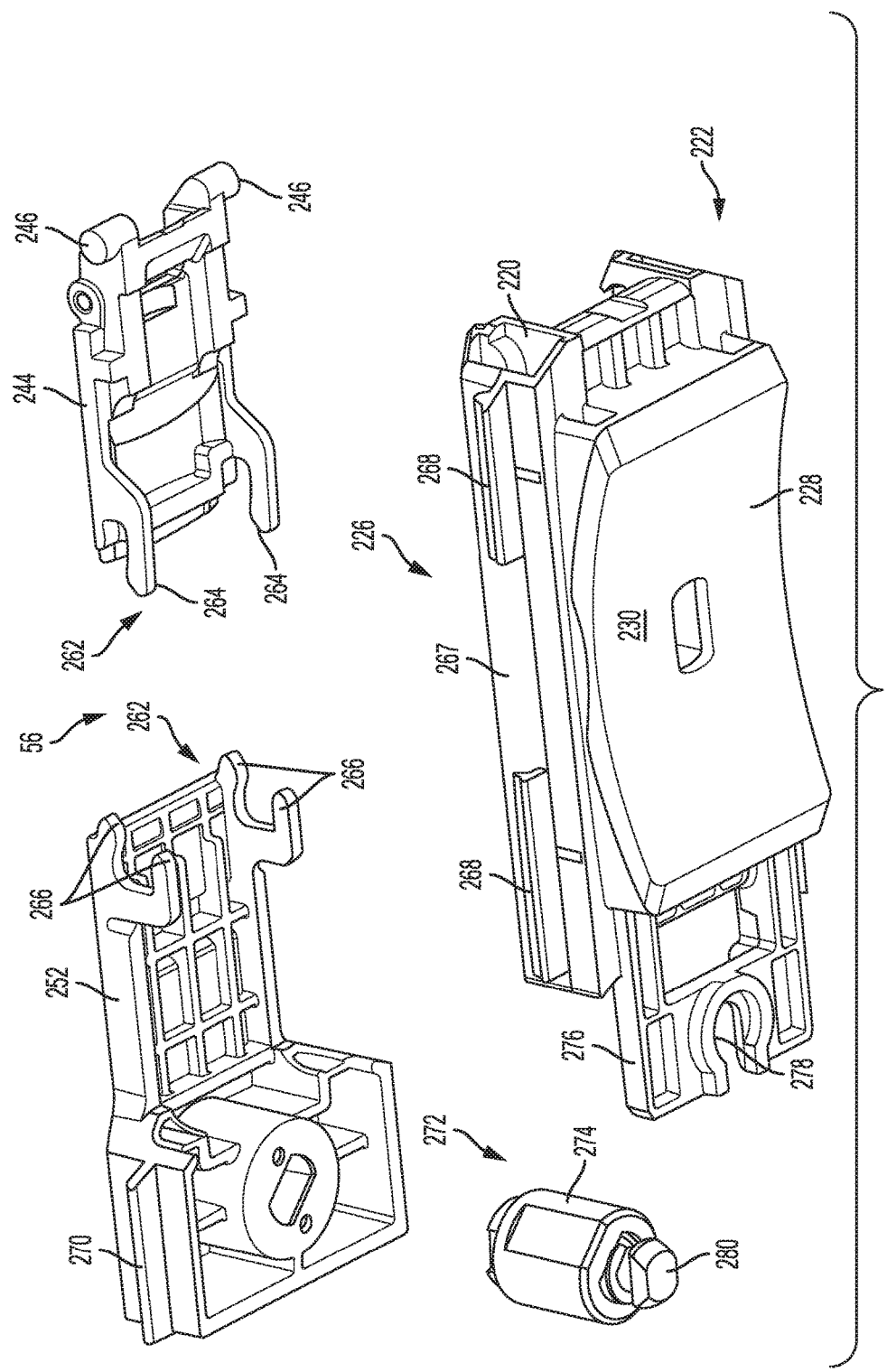
Figure 16:
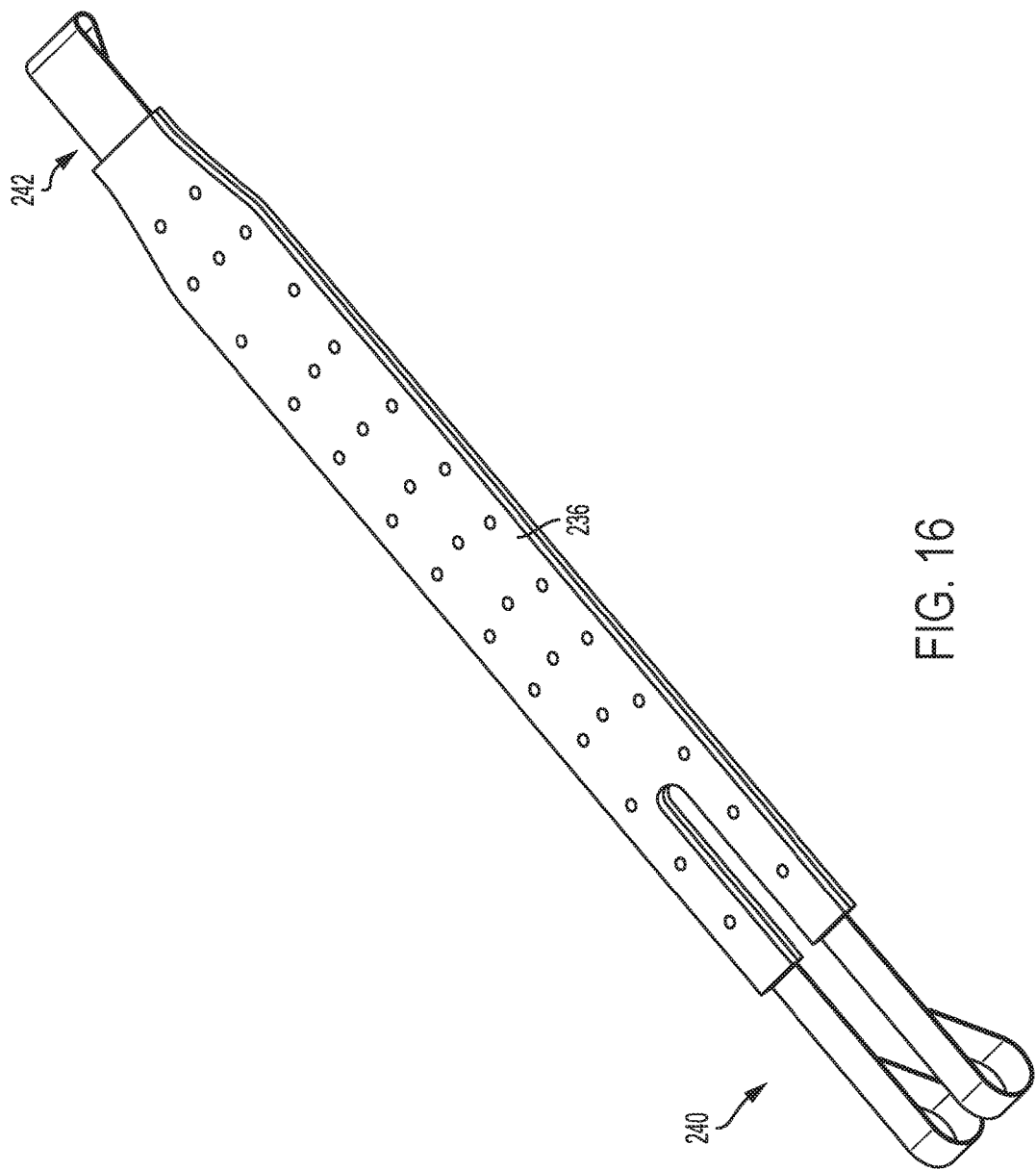
FIG. 16 is an isometric view of an illustrative flexible strap suitable for use in a strap-type crossbar clamp according to the present teachings.

Also with respect to rear crossbar clamp 56 only, a locking mechanism 272 may be included and configured to selectively lock the cover plate 252 in first position 254. Locking mechanism 272 may be present in any crossbar clamp, but a selected one of the clamps may be sufficient to secure the entire carrier. Locking mechanism 272 may be configured to selectively lock cover plate 252 to lower portion 228 of body 220 (or an extension thereof). For example, as shown in FIGS. 14-15, cover plate 252 may include a lock cylinder 274 and the lower portion of body 220 may include an extension plate 276 having an aperture 278 configured to mate with a cam 280 of lock cylinder 274.

With specific reference to FIGS. 18-21, aspects of operation of the clamps will now be described. In FIG. 18, lever plate 244 is in closed position 260 and cover plate 252 is in first position 254, such that fingers 264 and 266 are interlocked and lever plate 244 is prevented from opening. In this position, the strap (not shown here) will be tightened on the crossbar clamp and secured by the over-center action of the lever arm and the securing function of the cover plate.

Figure 20:
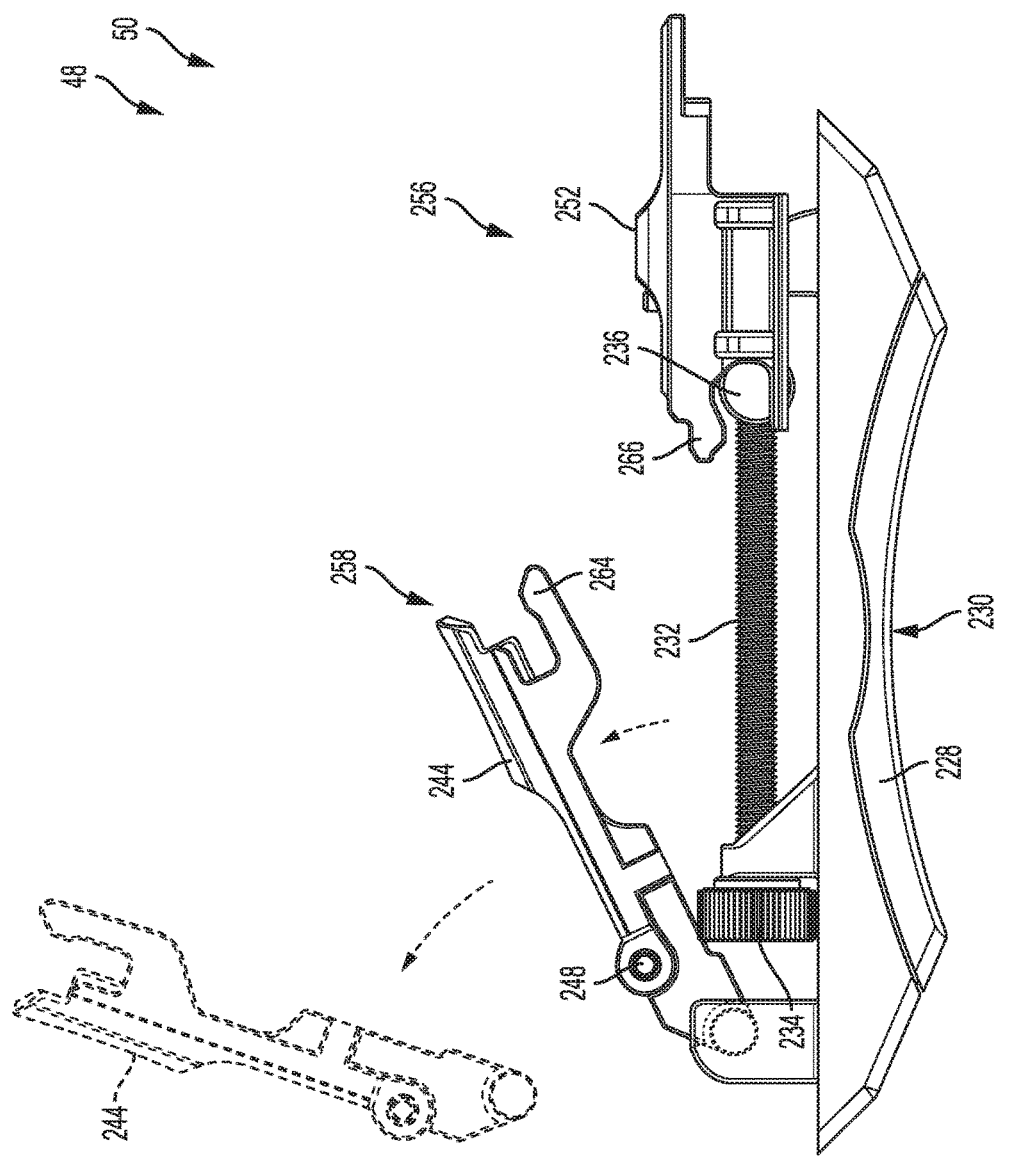
Figure 21:
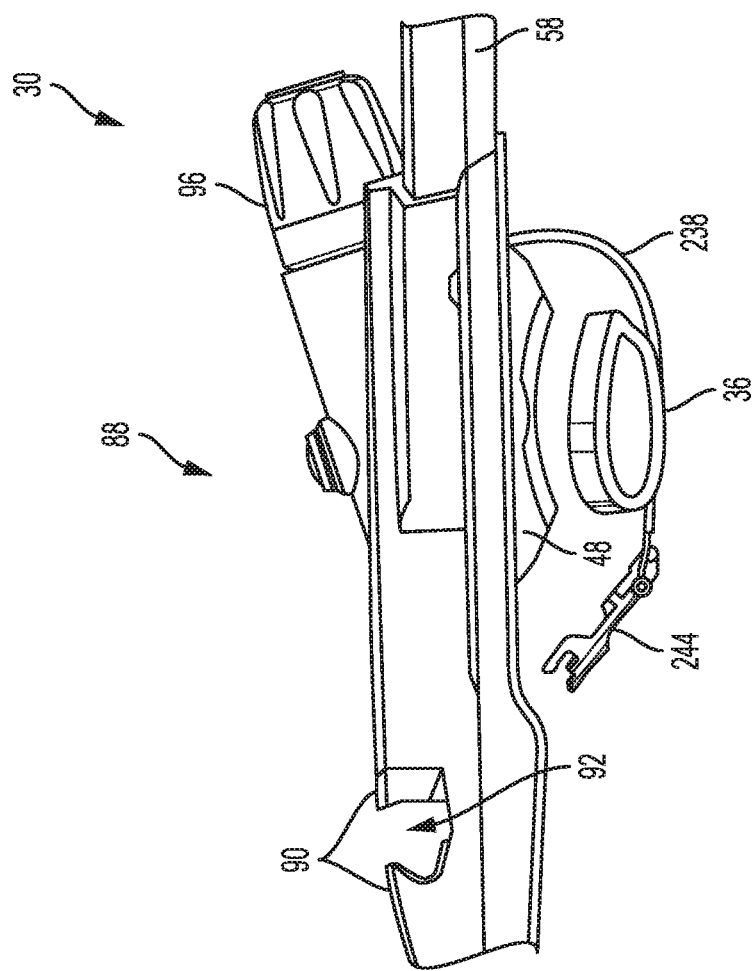
FIG. 21 is a side elevation view of the clamp of FIG. 17 partially installed on an illustrative crossbar, in accordance with aspects of the present disclosure.

In FIG. 19, cover plate 252 is slid into second position 256, such that the cover plate is no longer interlocked with lever plate 244. In FIG. 20, lever plate 244 is shown pivoting into open position 258 and being removed from body 220 (see dashed-outline of lever plate 244, indicated at 244'). FIG. 21 shows lever plate 244 being further passed around front crossbar 36 to remove carrier 30 from the vehicle rack.

These operations are reversible and repeatable, for selectively removing and securing carrier 30 with respect to the crossbar. For example, clamping onto crossbar 36 involves reversing the sequence of events, such that strap 238 and lever plate 244 are passed around crossbar 36 (see FIG. 21), shaft portion 246 is inserted into slot 250, and lever plate 244 is pivoted downward into closed position 260 (see FIG. 20), tightening strap 238 on the crossbar. Cover plate 252 is then slid from second position 256 to interlock with lever plate 244 in first position 254 (see FIGS. 19 and 18).

D. Additional Examples and Illustrative Combinations

This section describes additional aspects and features of fork-mount upright bicycle carriers according to the present teachings, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A bicycle mount for carrying a bicycle on a vehicle rack, the bicycle mount comprising:

an elongate base having a first end portion, a second end portion, and a pair of rails running generally parallel to a long axis of the base between the first end portion and the second end portion;

at least one clamp device coupled to the base and configured to clamp onto a crossbar disposed on a vehicle;

a fork mount device coupled to the first end portion of the base, the fork mount device configured to receive a transverse portion of a fork of a bicycle and including:
  an anvil jaw fixed relative to the base and configured to receive the transverse portion of the fork;
  a clamping jaw pivotable on a first axle between a release position, in which a distal end of the clamping jaw is pivoted away from the anvil jaw, and a clamping position, in which the distal end of the clamping jaw is pivoted toward the anvil jaw;
  a linkage assembly including a lever member rotatable on a fulcrum disposed between an actuator end and a load end of the lever member, and a link member pivotably coupling the load end of the lever member to the clamping jaw; and
  a rotary actuator including a threaded rod having a proximal end coupled to the actuator end of the lever member and a rotatable knob configured to change an effective length of the threaded rod, pivoting the lever member and urging the clamping jaw between the release position and the clamping position.

A1. The bicycle mount of paragraph A0, wherein the lever member comprises a plate and the fulcrum comprises a second axle about which the plate rotates.

A2. The bicycle mount of paragraph A1, wherein a major face of the plate is oriented substantially perpendicular to the second axle.

A3. The bicycle mount of paragraph A1, wherein the second axle is substantially parallel to the first axle.

A4. The bicycle mount of any of paragraphs A0 through A3, wherein the threaded rod extends away from the lever member in a direction generally toward the second end portion of the base.

A5. The bicycle mount of paragraph A4, wherein the rotatable knob is disposed at a distal end of the threaded rod.

A6. The bicycle mount of any of paragraphs A0 through A5, wherein the knob engages the threaded rod adjacent to an abutment plate that prevents movement of the knob toward the lever member.

A7. The bicycle mount of paragraph A6, wherein the effective length of the threaded rod is measured from the actuator end of the lever member to the abutment plate.

A8. The bicycle mount of any of paragraphs A0 through A7, further comprising a rear wheel receiver adjustably coupled to the base adjacent the second end portion, the rear wheel receiver including a bicycle wheel support structure, a strap configured to releasably secure the wheel to the wheel support structure, and at least one protrusion forming a first prismatic joint with a first slot running along a length of a respective one of the rails of the elongate base.

A9. The bicycle mount of paragraph A8, wherein the at least one clamp device includes a crossbar clamp adjustably coupled to the base by at least one second protrusion forming a second prismatic joint with a second slot running along a length of a respective one of the rails of the elongate base.

A10. The bicycle mount of paragraph A9, wherein the rear wheel receiver and the crossbar clamp are configured to slide past each other without interference, such that the rear wheel receiver and the crossbar clamp are adjustable along overlapping ranges of the elongate base.

A11. The bicycle mount of any of paragraphs A0 through A10, further including the transverse portion of the fork of the bicycle, the transverse portion comprising a generally cylindrical member securable in a pair of dropout openings in the fork.

B0. A bicycle mount for carrying a bicycle on a vehicle rack, the bicycle mount comprising:
an elongate base having a front portion, a rear portion, and at least one rail running generally parallel to a long axis of the base between the front portion and the rear portion;
at least one crossbar clamp coupled to the base and configured to clamp onto a crossbar mounted on a vehicle rooftop;
a bicycle fork-securing device coupled to the front portion of the base, the bicycle fork-securing device configured to receive a transverse member of a fork of a bicycle and including:
a first jaw fixed relative to the base and configured to receive the transverse member of the fork;
a second jaw pivotable on a first axis between a release position, in which a distal end of the second jaw is pivoted away from the first jaw, and a clamping position, in which the distal end of the second jaw is pivoted toward the first jaw; and
a linkage coupling the second jaw to a rotary actuator configured to urge the second jaw between the release position and the clamping position;
wherein the rotary actuator includes a threaded rod having a proximal end coupled to the linkage and a distal end coupled to a rotatable knob adjacent an abutment plate, such that the abutment plate prevents movement of the knob toward the linkage and rotation of the rotatable knob changes an effective length of the threaded rod.

B1. The bicycle mount of paragraph B0, wherein the threaded rod is in threaded and adjustable engagement with the knob, such that the threaded rod is axially translatable with respect to the knob.

B2. The bicycle mount of any of paragraphs B0 through B1, wherein the threaded rod is rotatably fixed to the knob, such that the knob and the threaded rod rotate together.

B3. The bicycle mount of paragraph B2, wherein the threaded rod is in threaded and adjustable engagement with the linkage, such that the threaded rod is axially translatable with respect to the linkage.

B4. The bicycle mount of any of paragraphs B0 through B3, wherein the linkage comprises a first link pivotably coupled to a second link, wherein the first link is coupled to the threaded rod at a first joint and the second link is coupled to the second jaw at a second joint.

B5. The bicycle mount of paragraph B4, wherein the first link is pivotable on a fulcrum, such that the first joint and the second joint are on opposite sides of the fulcrum.

C0. A bicycle carrier comprising
a pair of crossbars;
first and second pairs of crossbar-to-vehicle couplers configured to secure the crossbars on top of a vehicle, wherein the crossbars are parallel to each other and perpendicular to a long axis of the vehicle;
an elongate carrier base having first and second end portions and configured for mounting on the crossbars such that a long axis of the carrier base is perpendicular to the crossbars;
a rear wheel receiver adjustably coupled to the carrier base adjacent the second end portion; and
a fork mount device coupled to the carrier base adjacent the first end portion;
wherein the fork mount device includes:
a first jaw and a second jaw configured to clamp a transverse portion of a front fork of a bicycle therebetween;
the second jaw pivotable toward and away from the first jaw on an axle oriented transverse to the long axis of the carrier base; and
a linkage configured to convert linear motion of an actuator rod into pivoting motion of the second jaw, wherein the actuator rod is pivotably coupled to the linkage and in adjustably threaded engagement with a manually-rotatable member.

C1. The bicycle carrier of paragraph C0, further comprising the transverse portion of the front fork of the bicycle, wherein the transverse portion comprises a generally cylindrical member securable in a pair of dropout openings in the fork.

C2. The bicycle carrier of any of paragraphs C0 through C1, wherein the actuator rod is axially translatable with respect to the manually-rotatable member.

C3. The bicycle carrier of paragraph C2, wherein the manually-rotatable member comprises a knob prevented from moving toward the linkage by an abutment.

C4. The bicycle carrier of any of paragraphs C0 through C3, wherein the linkage comprises a first link pivotably coupled to a second link, wherein the first link is coupled to the actuator rod at a first joint and the second link is coupled to the second jaw at a second joint.

C5. The bicycle carrier of paragraph C4, wherein the first link is pivotable on a fulcrum, such that the first joint and the second joint are on opposite sides of the fulcrum.

D0. A clamp device for connecting a rack accessory to a crossbar on top of a vehicle, the clamp device comprising:

a body including a first end portion, a second end portion, an upper portion, and a lower portion having a cushioned concave surface configured to contact a top side of the crossbar;

a threaded rod rotatably coupled to the upper portion of the body, the threaded rod having a dial manipulable to rotate the rod, and a traveling member in threaded engagement with the rod;

a flexible strap having an effective length and a proximal end coupled to the traveling member such that the flexible strap is coupled to the first end portion of the body;

a distal end of the flexible strap coupled to a lever plate having a transverse shaft portion;

the second end portion of the body including a slot configured to receive the shaft portion of the lever plate, such that the lever plate is releasably engageable with the second end portion; and a cover plate coupled to the first end portion of the body, the cover plate being slidable along the body between a first position and a second position;

wherein rotation of the dial causes alteration of the effective length of the flexible strap;

wherein the lever plate is pivotably transitionable, when the shaft portion is seated in the slot, between an open position and a closed position, such that transitioning from the open position to the closed position causes a decrease in the effective length of the flexible strap; and wherein the cover plate blocks the lever plate from opening when the lever plate is in the closed position and the cover plate is in the first position, such that the lever plate is prevented by the cover plate from transitioning to the open position until the cover plate is in the second position.

D1. The clamp device of paragraph D0, further comprising:

a first tab on a first lateral side of the body, the tab configured to form a prismatic joint with a corresponding slot in the rack accessory;

wherein a position of the clamp device relative to the rack accessory is adjustable along a length of the slot.

D2. The clamp device of any of paragraphs D0 through D1, wherein respective opposing ends of the cover plate and the lever plate include finger portions configured to interdigitate when the the lever plate is in the closed position and the cover plate is in the first position, such that the cover plate and the lever plate are interlockable.

D3. The clamp device of any of paragraphs D0 through D2, further comprising a locking mechanism configured to selectively lock the cover plate in the first position.

D4. The clamp device of paragraph D3, wherein the locking mechanism is configured to selectively lock the cover plate to the lower portion of the body.

D5. The clamp device of paragraph D4, wherein the cover plate comprises a lock cylinder and the lower portion of the body comprises an extension plate having an aperture configured to mate with a cam of the lock cylinder.

D6. The clamp device of any of paragraphs D0 through D5, wherein the body includes a pair of side walls extending from the first end portion to the second end portion, the pair of side walls configured to prevent access to the threaded rod.

E0. A bicycle carrier for carrying a bicycle on a vehicle rack, the bicycle carrier comprising:

an elongate base having a first end portion, a second end portion, and a pair of rails running generally parallel to a long axis of the base between the first end portion and the second end portion, each of the rails having an upper slot and a lower slot, each of the slots running along a respective length of the rail;

a first bicycle mounting device coupled to the first end portion of the base and configured to secure a first portion of a bicycle to the bicycle carrier;

a first crossbar clamp coupled to the base adjacent the first bicycle securing device, the first crossbar clamp configured to clamp onto a first crossbar mounted to a vehicle rooftop;

a wheel receiver adjustably coupled to at least one of the upper slots of the pair of rails and configured to secure a wheel of the bicycle to the bicycle carrier; and a second crossbar clamp adjustably coupled to at least one of the lower slots of the pair of rails and configured to clamp a second crossbar mounted to the vehicle rooftop;

wherein the wheel receiver and the second crossbar clamp are adjustable along an overlapping range of positions with respect to the pair of rails.

E1. The bicycle carrier of paragraph E0, wherein the second crossbar clamp comprises a pair of lateral tabs each in sliding engagement with a respective one of the lower slots.

E2. The bicycle carrier of paragraph E1, wherein each of the lateral tabs has a proximal portion adjacent a mouth of the lower slot and a distal portion encompassed by the lower slot, the distal portion being larger than the proximal portion.

E3. The bicycle carrier of any of paragraphs E0 through E2, wherein the wheel receiver comprises a wheel tray disposed above the pair of rails and a pair of protrusions each in sliding engagement with a respective one of the upper slots.

E4. The bicycle carrier of any of paragraphs E0 through E3, wherein each of the rails has a respective inner wall, and each upper slot is disposed in a respective one of the inner walls.

E5. The bicycle carrier of paragraph E4, wherein each lower slot is disposed in a respective one of the inner walls.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A bicycle mount for carrying a bicycle on a vehicle rack, the bicycle mount comprising:

an elongate base having a first end portion, a second end portion, and a pair of rails running generally parallel to a long axis of the base between the first end portion and the second end portion;

at least one clamp device coupled to the base and configured to clamp onto a crossbar disposed on a vehicle;
a fork mount device coupled to the first end portion of the base, the fork mount device configured to receive a transverse portion of a fork of a bicycle and including:
an anvil jaw fixed relative to the base and configured to receive the transverse portion of the fork;
a clamping jaw pivotable on a first axle between a release position, in which a distal end of the clamping jaw is pivoted away from the anvil jaw, and a clamping position, in which the distal end of the clamping jaw is pivoted toward the anvil jaw;
a linkage assembly including a lever member rotatable on a fulcrum disposed between an actuator end and a load end of the lever member, and a link member pivotably coupling the load end of the lever member to the clamping jaw; and
a rotary actuator including a threaded rod having a proximal end coupled to the actuator end of the lever member and a rotatable knob configured to change an effective length of the threaded rod, pivoting the lever member and urging the clamping jaw between the release position and the clamping position.

2. The bicycle mount of claim 1, wherein the lever member comprises a plate and the fulcrum comprises a second axle about which the plate rotates.

3. The bicycle mount of claim 2, wherein a major face of the plate is oriented substantially perpendicular to the second axle.

4. The bicycle mount of claim 2, wherein the second axle is substantially parallel to the first axle.

5. The bicycle mount of claim 1, wherein the threaded rod extends away from the lever member in a direction generally toward the second end portion of the base.

6. The bicycle mount of claim 5, wherein the rotatable knob is disposed at a distal end of the threaded rod.

7. The bicycle mount of claim 1, wherein the knob engages the threaded rod adjacent to an abutment plate that prevents movement of the knob toward the lever member.

8. The bicycle mount of claim 7, wherein the effective length of the threaded rod is measured from the actuator end of the lever member to the abutment plate.

9. The bicycle mount of claim 1, further comprising a rear wheel receiver adjustably coupled to the base adjacent the second end portion, the rear wheel receiver including a bicycle wheel support structure, a strap configured to releasably secure the wheel to the wheel support structure, and at least one protrusion forming a first prismatic joint with a first slot running along a length of a respective one of the rails of the elongate base.

10. The bicycle mount of claim 9, wherein the at least one clamp device includes a crossbar clamp adjustably coupled to the base by at least one second protrusion forming a second prismatic joint with a second slot running along a length of a respective one of the rails of the elongate base.

11. The bicycle mount of claim 10, wherein the rear wheel receiver and the crossbar clamp are configured to slide past each other without interference, such that the rear wheel receiver and the crossbar clamp are adjustable along overlapping ranges of the elongate base.

12. The bicycle mount of claim 1, further including the transverse portion of the fork of the bicycle, the transverse portion comprising a generally cylindrical member securable in a pair of dropout openings in the fork.

13. A bicycle mount for carrying a bicycle on a vehicle rack, the bicycle mount comprising:

an elongate base having a front portion, a rear portion, and at least one rail running generally parallel to a long axis of the base between the front portion and the rear portion;
at least one crossbar clamp coupled to the base and configured to clamp onto a crossbar mounted on a vehicle rooftop;
a bicycle fork-securing device coupled to the front portion of the base, the bicycle fork-securing device configured to receive a transverse member of a fork of a bicycle and including:
a first jaw fixed relative to the base and configured to receive the transverse member of the fork;
a second jaw pivotable on a first axis between a release position, in which a distal end of the second jaw is pivoted away from the first jaw, and a clamping position, in which the distal end of the second jaw is pivoted toward the first jaw; and
a linkage coupling the second jaw to a rotary actuator configured to urge the second jaw between the release position and the clamping position;
wherein the rotary actuator includes a threaded rod having a proximal end coupled to the linkage and a distal end coupled to a rotatable knob adjacent an abutment plate, such that the abutment plate prevents movement of the knob toward the linkage and rotation of the rotatable knob changes an effective length of the threaded rod.

14. The bicycle mount of claim 13, wherein the threaded rod is in threaded and adjustable engagement with the knob, such that the threaded rod is axially translatable with respect to the knob.

15. The bicycle mount of claim 13, wherein the threaded rod is rotatably fixed to the knob, such that the knob and the threaded rod rotate together.

16. The bicycle mount of claim 15, wherein the threaded rod is in threaded and adjustable engagement with the linkage, such that the threaded rod is axially translatable with respect to the linkage.

17. The bicycle mount of claim 13, wherein the linkage comprises a first link pivotably coupled to a second link, wherein the first link is coupled to the threaded rod at a first joint and the second link is coupled to the second jaw at a second joint.

18. The bicycle mount of claim 17, wherein the first link is pivotable on a fulcrum, such that the first joint and the second joint are on opposite sides of the fulcrum.

19. A bicycle carrier comprising
a pair of crossbars;
first and second pairs of crossbar-to-vehicle couplers configured to secure the crossbars on top of a vehicle, wherein the crossbars are parallel to each other and perpendicular to a long axis of the vehicle;
an elongate carrier base having first and second end portions and configured for mounting on the crossbars such that a long axis of the carrier base is perpendicular to the crossbars;
a rear wheel receiver adjustably coupled to the carrier base adjacent the second end portion; and
a fork mount device coupled to the carrier base adjacent the first end portion;
wherein the fork mount device includes:
a first jaw and a second jaw configured to clamp a transverse portion of a front fork of a bicycle therebetween;

the second jaw pivotable toward and away from the first jaw on an axle oriented transverse to the long axis of the carrier base; and a linkage configured to convert linear motion of an actuator rod into pivoting motion of the second jaw, wherein the actuator rod is pivotably coupled to the linkage and in adjustably threaded engagement with a manually-rotatable member.

20. The bicycle carrier of claim 19, further comprising the transverse portion of the front fork of the bicycle, wherein the transverse portion comprises a generally cylindrical member securable in a pair of dropout openings in the fork.

* * * * *